US012015882B2

(12) United States Patent
Zavesky et al.

(10) Patent No.: US 12,015,882 B2
(45) Date of Patent: Jun. 18, 2024

(54) SYSTEM AND METHOD TO EVALUATE NEARBY SURFACES AND TO ADAPT CONTENT FOR PROJECTION THEREON

(71) Applicant: AT&T Intellectual Property I, L.P., Atlanta, GA (US)

(72) Inventors: Eric Zavesky, Austin, TX (US); Brian Novack, St. Louis, MO (US); Rashmi Palamadai, Naperville, IL (US); Tan Xu, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 106 days.

(21) Appl. No.: 17/732,156

(22) Filed: Apr. 28, 2022

(65) Prior Publication Data
US 2023/0353715 A1 Nov. 2, 2023

(51) Int. Cl.
*G03B 21/14* (2006.01)
*H04N 9/31* (2006.01)

(52) U.S. Cl.
CPC ......... *H04N 9/3194* (2013.01); *H04N 9/3185* (2013.01)

(58) Field of Classification Search
CPC ...... G03B 21/145; G03B 21/14; G03B 21/30; H04N 9/3179; H04N 9/3173
See application file for complete search history.

(56) References Cited

U.S. PATENT DOCUMENTS

| 6,554,431 | B1* | 4/2003 | Binsted ............... H04N 5/74 353/69 |
| 8,840,250 | B1* | 9/2014 | Yao .................. G01S 17/46 353/77 |
| 2015/0356704 | A1 | 12/2015 | Lipman et al. |
| 2018/0101987 | A1 | 4/2018 | Grundhöfer et al. |
| 2018/0190035 | A1 | 7/2018 | Grundhöfer et al. |
| 2020/0099903 | A1 | 3/2020 | Orlick et al. |

OTHER PUBLICATIONS

"Procams—Disney Research Studios", https://studios.disneyresearch.com/procams/, Accessed Mar. 29, 2022, 13 pages.
Bermano, et al., "Augmenting Physical Avatars using Projector-Based Illumination", 2013, 10 pages.
Bermano, et al., "Makeup Lamps: Live Augmentation of Human Faces via Projection", 2017, 13 pages.
(Continued)

*Primary Examiner* — Ryan D Howard
(74) *Attorney, Agent, or Firm* — Guntin & Gust, PLC; Dana LeMoine

(57) ABSTRACT

Aspects of the subject disclosure may include, for example, obtaining sensor data that includes an image of a projection environment, determining physical objects portrayed within the image, and characterizing physical properties of the physical objects according to the sensor data to obtain a characterization. A first target object of the physical objects having a first projection surface is identified according to the characterization, and a source image is modified according to the first projection surface. The modified image is provided to a projector adapted to project the modified image onto the first projection surface. Other embodiments are disclosed.

20 Claims, 11 Drawing Sheets

(56) References Cited

OTHER PUBLICATIONS

Fujii, et al., "A Projector-Camera System with Real-Time Photometric Adaptation for Dynamic Environments", 2005, 8 pages.
Grundhöfer, et al., "Robust, Error-Tolerant Photometric Projector Compensation", 2015, 13 pages.
Grundhöfer, Anselm, "Practical Non-linear Photometric Projector Compensation", Sep. 2013, 6 pages.
Nomoto, et al., "Intensity Control of Projectors in Parallel—A Doorway to an Augmented Reality Future", Mar. 16, 2022, 4 pages.
Pjanic, et al., "Geometric and Photometric Consistency in a Mixed Video and Galvanoscopic Scanning Laser Projection Mapping System", 2007, 10 pages.
Pjanic, et al., "Paxel: A Generic Framework to Superimpose High-Frequency Print Patterns using Projected Light", Aug. 2015, 14 pages.
Tehrani, et al., "A Practical Method for Fully Automatic Intrinsic Camera Calibration Using Directionally Encoded Light", 2017, 9 pages.
Willi, et al., "Robust Geometric Self-Calibration of Generic Multi-Projector Camera Systems", 2017, 10 pages.
Willi, et al., "Spatio-Temporal Point Path Analysis and Optimization of a Galvanoscopic Scanning Laser Projector", 2007, 8 pages.

\* cited by examiner

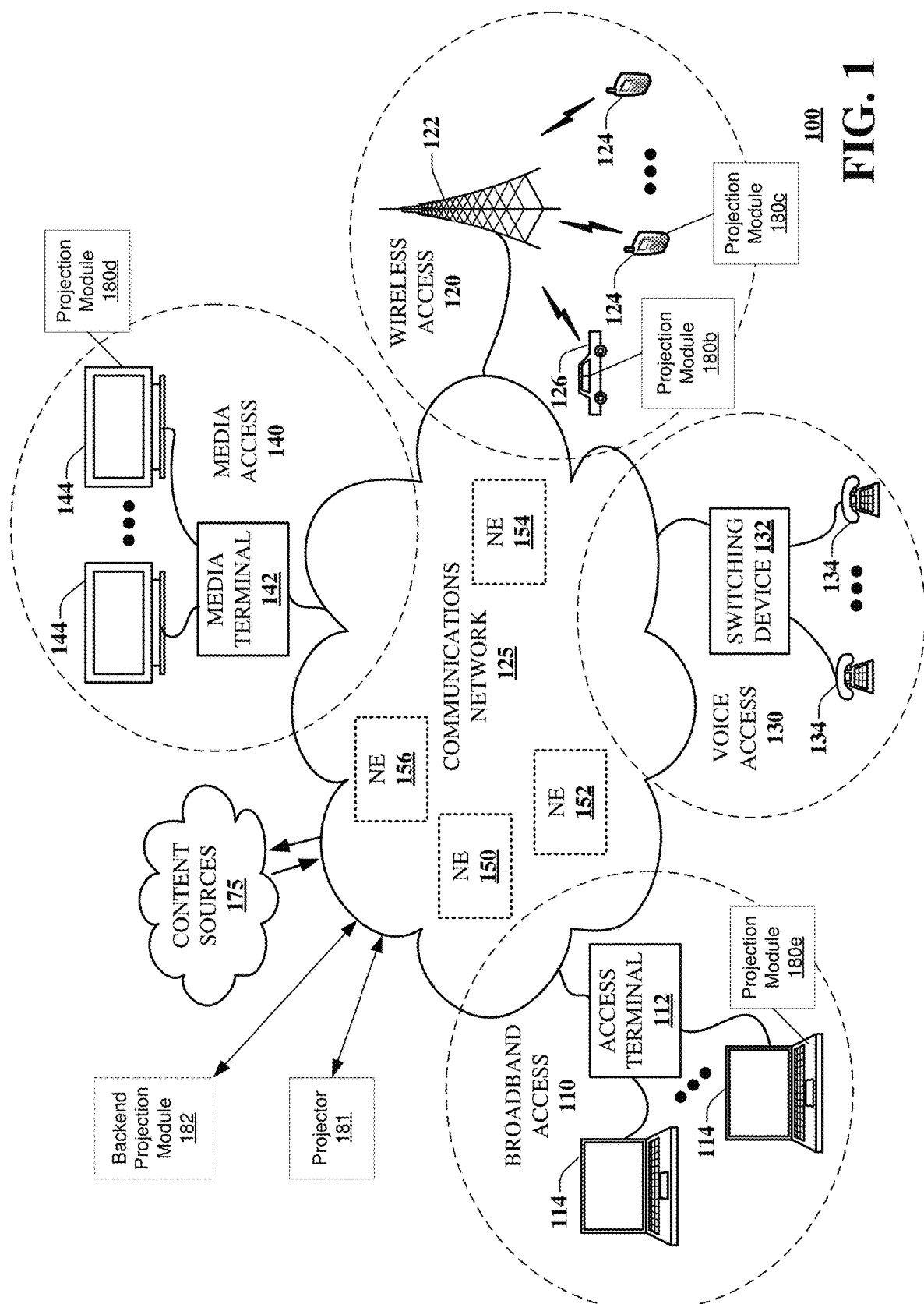

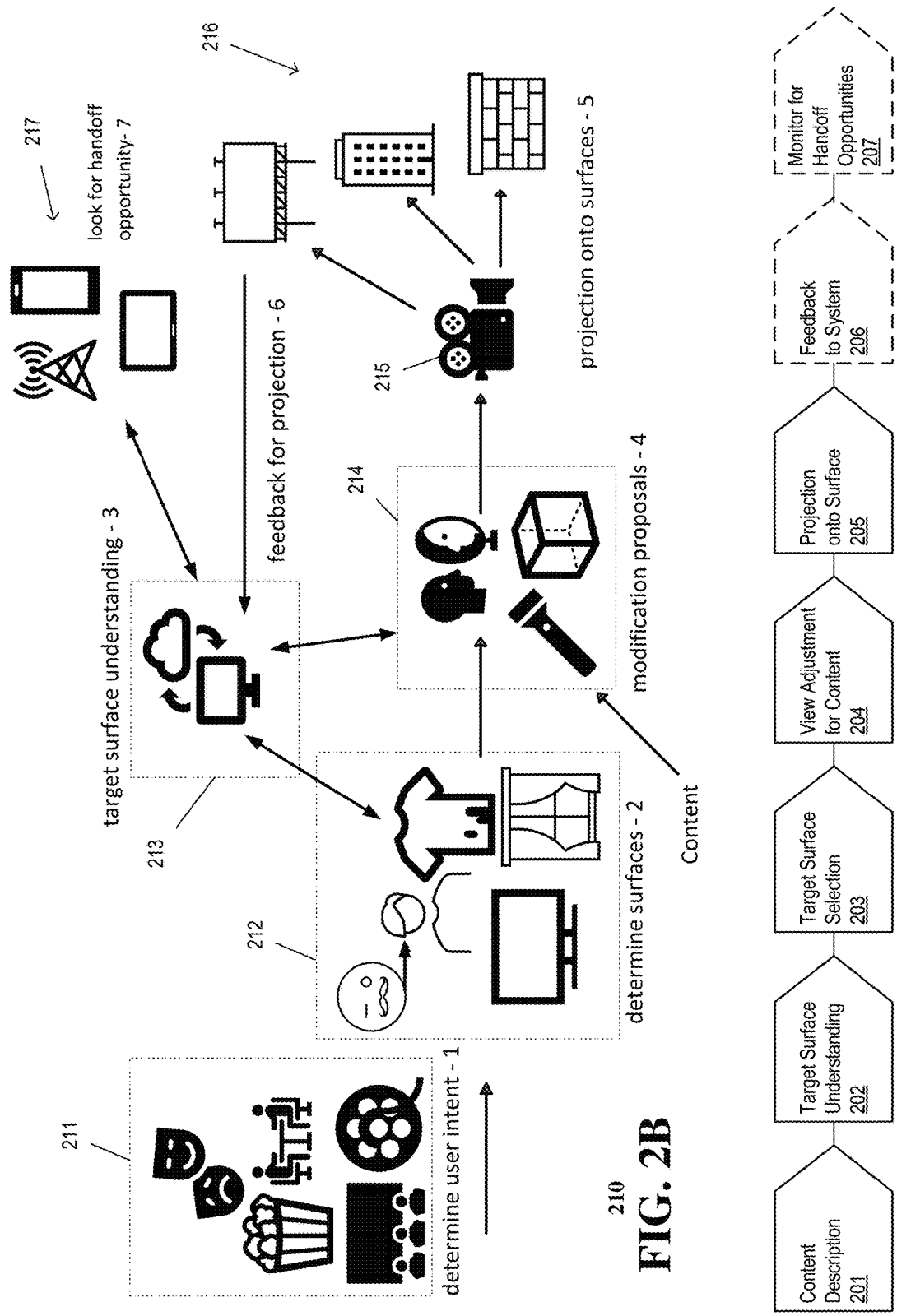

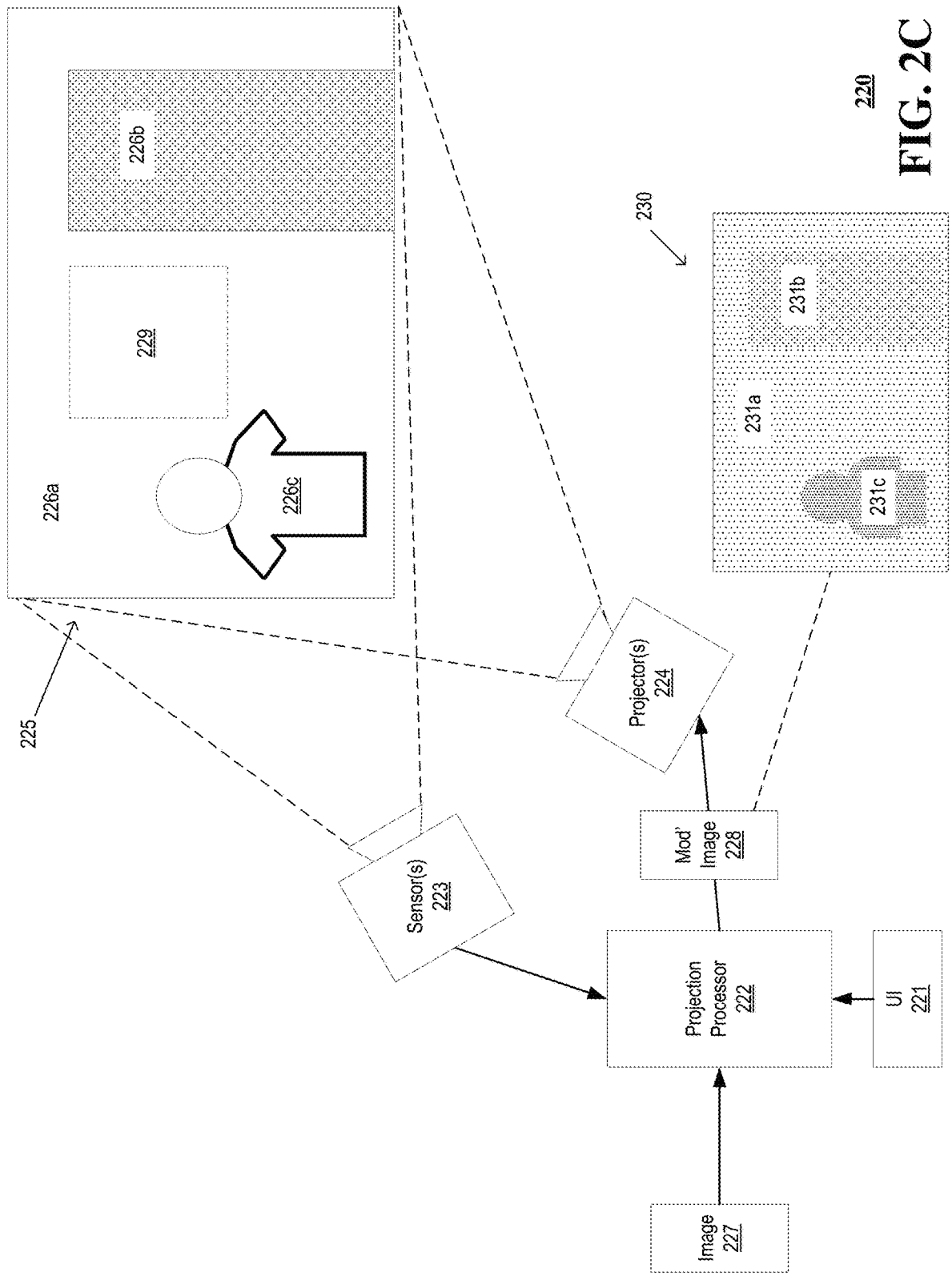

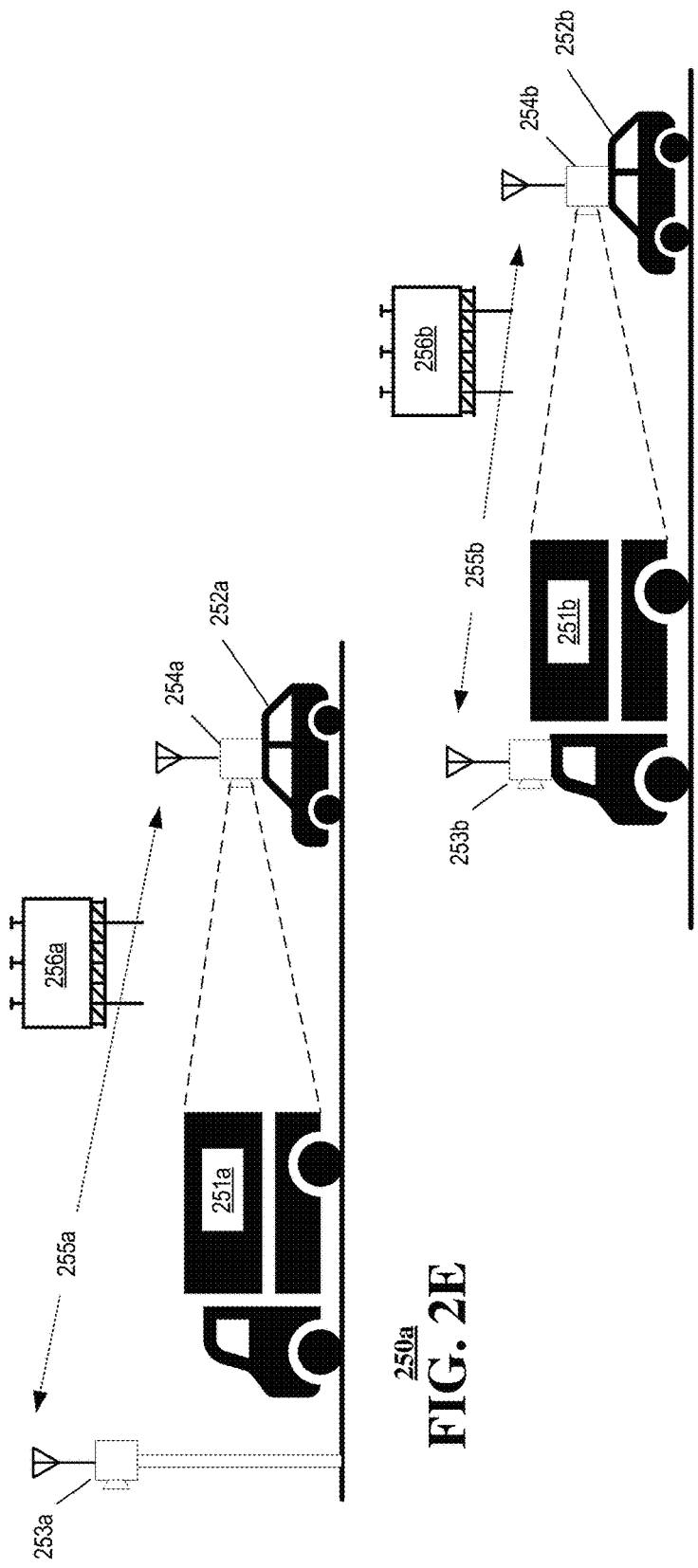

SYSTEM AND METHOD TO EVALUATE NEARBY SURFACES AND TO ADAPT CONTENT FOR PROJECTION THEREON

FIELD OF THE DISCLOSURE

The subject disclosure relates to a system and method to evaluate nearby surfaces and to adapt content for projection thereon.

BACKGROUND

An image projector, or simply projector, is an optical device that projects light portraying an image and/or moving images onto a projection surface. In operation the projector accepts an image or video input, processes it with the assistance of an optical projection system consisting of a lens and optical source, and projects the enhanced output on the projection surface. The projection surface is usually light in color, such as a white screen or sometimes a wall, commonly a projection screen. In at least some applications, the projected light has been used to alter the appearance of objects, such as architectural structures.

Early projectors included opto-mechanical devices, in which light was projected through motion picture film. More recent projectors include liquid crystal display (LCD), in which light is projected through an array of liquid crystals, and digital light processing (DLP), in which light is projected off of an array of micro mirrors. The liquid crystals or micro mirrors may be electronically controlled, e.g., modulated, to produce a projection image when combined with the projection light source.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 2A depicts an illustrative embodiment of an adaptive image projection process in accordance with various aspects described herein.

FIG. 2B is a block diagram illustrating an example, non-limiting embodiment of an adaptive image projection system functioning within the communication network of FIG. 1 in accordance with various aspects described herein.

FIG. 2C is a block diagram illustrating another example, non-limiting embodiment of an adaptive image projection system functioning within the communication network of FIG. 1 in accordance with various aspects described herein.

FIG. 2E through 2G are block diagrams illustrating an example, non-limiting embodiment of a local, adaptive roadway image projection system functioning within the communication network of FIG. 1 in accordance with various aspects described herein.

DETAILED DESCRIPTION

Figure 2D:
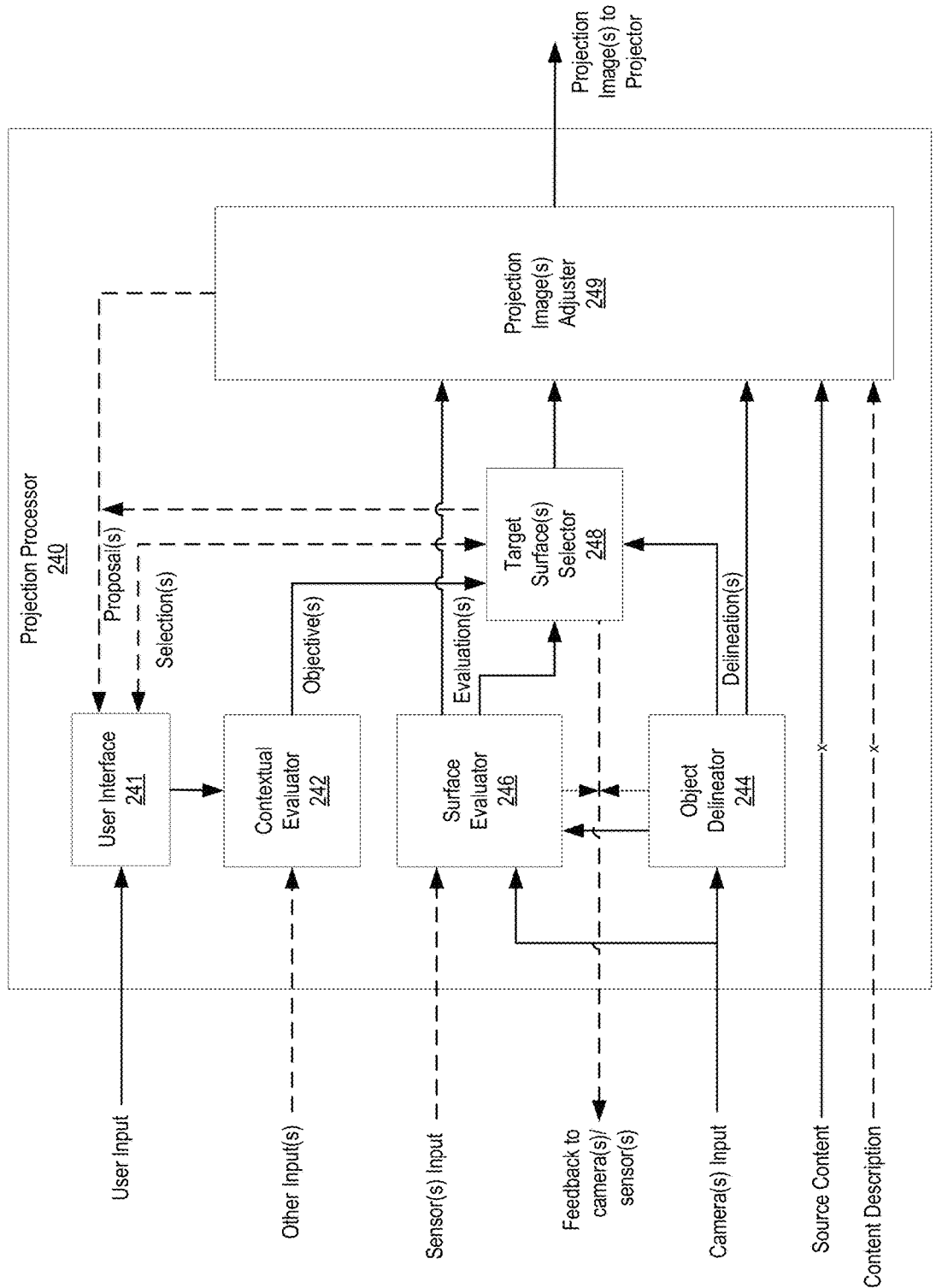
FIG. 2D is a block diagram illustrating, in more detail, an example, non-limiting embodiment of a projection processor functioning within the adaptive image projection system of FIG. 2C in accordance with various aspects described herein.

The subject disclosure describes, among other things, illustrative embodiments for selecting an object within a local environment, characterizing a surface feature of the selected object, and adapting source content according to the characterization of the surface feature, wherein a projection of the adapted source content is formed by an illumination of the surface feature by the image projector. Other embodiments are described in the subject disclosure.

One or more aspects of the subject disclosure include a process that includes receiving, by a processing system including a processor, sensor data that includes an image of a projection environment. A number of physical objects of the projection environment portrayed within the image are automatically identified by the processing system. A number of physical objects are evaluated by the processing system to obtain an evaluation of the physical objects. A first target object of the number of physical objects is selected by the processing system according to the evaluation of the physical objects, with a first projection surface including a surface of the first target object. A source image is adjusted by the processing system according to the first projection surface to obtain a first adjusted source image, which is provided by the processing system to a projection system adapted to project the first adjusted source image onto the first projection surface.

One or more aspects of the subject disclosure include a system that includes a processing system having a processor and a memory that stores executable instructions. The executable instructions, when executed by the processing system, facilitate performance of operations that include obtaining sensor data that includes an image of a projection environment. A number of physical objects portrayed within the image are identified and a number of physical properties of the physical objects are evaluated according to the sensor data to obtain an evaluation. A first target object is selected from among the number of physical objects according to the evaluation, with a first projection surface including a surface of the first target object. A source image is modified according to the first projection surface to obtain a first modified source image, which is provided to a projector adapted to project the first modified source image onto the first projection surface.

One or more aspects of the subject disclosure include a non-transitory, machine-readable medium, that includes executable instructions. The executable instructions, when executed by a processing system including a processor, facilitate performance of operations that include obtaining sensor data that includes an image of a projection environment. A number of physical objects portrayed within the image are determined, and a number of physical properties of the physical objects are determined according to the sensor data to obtain a characterization. A first target object is identified from among the number of physical objects according to the characterization, with a first projection surface including a surface of the first target object. Source content is modified according to the first projection surface to obtain first modified source content, which is providing to a projector adapted to project the first modified content onto the first projection surface.

The example embodiments disclosed herein are adapted to display and/or otherwise project content onto a variety of surfaces of physical objects, having surfaces that may be static, moving and/or otherwise changing. For example, a user may intend to project an image, such as a map or a video clip onto a surface for informational and/or entertainment purpose. The systems and processes may be configured to automatically detect a suitable surface, e.g., having a suitable surface type, a suitable shape and/or at a suitable distance for projection. For scenarios in which multiple suitable surfaces exist, a preferred one of the suitable surfaces may be selected, e.g., as a preferred, or an ideal surface, to the extent predetermined ideal projection surface conditions, e.g., approaching silver screen conditions, are satisfied. One or more of the projected images and/or the selected projection surfaces may be moving. To the extent the projection surface moves, such movement may be tracked, and adjustments made to the projected images based on the tracked movements. Other adaptations are provided source content prior to projection to improve and/or otherwise enhance the projection result. For example, projections may be adjusted to occur at a correct angle, adjusted for light, and/or otherwise modified to accommodate changes in 3D space.

In at least some embodiments, the systems and processes may be adapted to make adjustments to accommodate for any obstructions that might occur to otherwise detract from a projection event. For example, in at least some embodiments, the obstruction may be used to further enhance the projected display, e.g., allowing the display to be widened, lengthened, and/or to present a more suitable surface to accommodate the projected display. Accordingly, the systems and processes may use an obstruction to add to a projected display and/or to change a focus of the projection, e.g., to pull in aspects of the proximal physical environment as they may occur and/or adapt over time.

By way of further example, the projected content may include one or more scenarios encountered in daily life, entertainment, manufacturing, recipes, general instructional content. Beneficially, the content is adapted for projection onto one or more surfaces around the user. Example embodiments may take into account a type of surface and adjust the content prior to projection of source content for optimal viewing, when the projection is observed upon the intended target object. In at least some embodiments, adjustment of the source content may consider one or more predetermined observation locations and/or angles, such that the adjustments are adapted to present favorable projections at the intended viewing locations. It is envisioned that in at least some embodiments, one or more observation locations and/or angles may be recommended based on a particular target projection object and/or a number of potential target projection objects. Such recommended viewing locations/angles may be the same or differ from a location at which an image and/or sensor data was obtained for the projection environment.

Referring now to FIG. 1, a block diagram is shown illustrating an example, non-limiting embodiment of a system 100 in accordance with various aspects described herein. For example, system 100 can facilitate, in whole or in part, selecting an object within a local environment, characterizing a surface feature of the selected object, and adapting source content according to the characterization of the surface feature, wherein a projection of the adapted source content is formed by an illumination of the surface feature by the image projector. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The illustrative system 100 further includes one or more projection modules 180a, 180b, 180c, 180d, generally 180, adapted to evaluate sensor data obtained from a proximal physical environment, e.g., within a projection range of a projection device, to automatically identify and/or otherwise characterize physical objects present at the proximal physical locations, and to select at least one of the physical objects as a suitable host for accommodating upon its surface a projection of source content, e.g., a media content item. In at least some embodiments, the projection modules 180 adapt the source content according to one or more physical properties of a surface of the selected physical object, such that an irregularity of the surface, e.g., a boundary shape, a lighting, a color, a texture and/or a variation in physical distance and/or focal length from the projector, may be compensated for prior to projection of the adjusted media content. In at least some embodiments, the projection modules 180 may include an error detection and/or correction capability to improve a projection of an adjusted image based on observed errors. Likewise, in at least some embodiments, the projection modules 180 may be adapted to select the target object and/or adjust the media content for projection thereupon based on a mobility state, e.g., whether the target object is stationary, moving, warping, and/or some other alteration of a physical characteristic of the target object, such as a change in lighting, shadow, obstruction, and the like.

In at least some embodiments, a projection module 180 may include a self-contained system adapted to process information received from one or more cameras and/or other environmental sensors, to process the input as appropriate in view of the media content and/or an objective of the projection event, and to provide an adjusted image to a projector 181 adapted to project the adjusted image onto a selected physical object within a proximal physical environment. Alternatively or in addition, the projection module 180 may be adapted to cooperate with one or more other devices and/or systems. By way of illustrative example, a backend server may host a projection module 182 at a remote location, distant from the proximate physical environment, but in communication with a local projection module 180, e.g., according to a client-server model, as a network-hosted, and/or as an over-the-top service.

FIG. 2A depicts an illustrative embodiment of an adaptive image projection process 200 in accordance with various aspects described herein. The example adaptive image projection process 200 identifies source content at 201 for projection upon a surface of one or more physical objects. Identification of the source content may include receiving input from a user device, e.g., in a form of a user selection. The user selection may include a file name, a title, a source location, a URL to linked content, and the like. Alternatively or in addition, a description of the source content may be obtained from metadata of the source content that may be accessed, opened, and/or otherwise launched, e.g., responsive to the user selection.

The source content may include, without limitation, any content suitable for presentation by an image projection device. For example, the source content may include, without limitation, media content, e.g., a graphical image, a photographic image, a video image, e.g., obtained from a video recorder and/or including animation, text, icons, and the like. By way of further example, the source content may include entertainment content, informational content, advertising content, and the like. Examples of entertainment content may include, without limitation, still images, streaming video and interactive content, including interactive gaming content. In at least some embodiments, entertainment content may include content adapted for theatrical projections that may include one or more of makeup designs, costume, and costume element designs, such as garments, props, and/or other character and/or scenic elements, and so on. Examples of informative content may include educational material, e.g., lectures, textual content, images, such as maps, directions, instructional videos, e.g., music lessons, how-to examples, cooking, recipes and the like.

In at least some embodiments, the content may include immersive content, including augmented reality (AR) and/or virtual reality (VR), e.g., metaverse content, and the like. Advertising content may include still and/or moving images of one or more of products, product trademarks, e.g., slogans, logos, product packaging or trade dress. One or more of these items may be presented in a form of a commercial and/or a projection to promote branding, e.g., in a form of slogans, product placement, trade dress and the like.

The adaptive image projection process 200 further includes obtaining an understanding at 202 of one or more physical objects present within a proximal physical environment. In particular, such understanding may include understandings of one or more features and/or characteristics of any physical objects present, as they may be relevant the physical objects serving as projection surfaces for the aforementioned content. Accordingly, the one or more features and/or characteristics of the physical objects may be identified and/or otherwise quantified as may be beneficial to facilitate a selection of the target object.

Features and/or characteristics of the physical objects may include, without limitation, sizes, shapes, locations, orientations, color, texture, flatness and/or curvature, lighting, and so on. At least some of the features and/or characteristics may be obtained automatically by evaluation of the image. Image evaluations may include computer vision, object identification and/or other techniques adapted to delineate perimeters and/or boundaries distinguishing the physical objects and/or surfaces. Other features and/or characteristics of the physical objects and/or surfaces may be identified from the captured image alone, by information obtained from one or more sensors deployed within the physical location captured in the image, or from some combination of both.

Examples of some sensors include, without limitation, cameras, including arrays of multiple cameras, infrared cameras, light intensity measuring devices, such as photometric sensors, radiometric sensors, surface reflection sensors, location sensors, e.g., geolocation sensors, distance sensors, e.g., sonar, and/or acoustic sensors, including ultrasonic distance-measuring devices, such as time-of-flight sensors, lidar and/or 3D laser scanning systems and the like. It is understood that in at least some embodiments, one or more of the various example sensors may require calibration.

In at least some embodiments, an imaging device, such as a camera, obtains an image of a physical location at which media content is to be presented and/or projected onto a surface of opportunity. The image may be evaluated automatically to identify one or more physical objects and/or surfaces within the image, at least one of the available physical objects and/or surfaces may be selected as a projection target. In at least some embodiments, at least one target object is selected from among the physical objects captured within the image, to accommodate at least a portion of a projection of the content. Selection of the object may be obtained automatically, e.g., choosing an optimal, preferred, and/or otherwise suitable surface for accommodating the projection.

According to the example process 200, a selection of a target surface is made at 203. Selection of the target surface may be based at least in part on the understanding of the physical objects obtained at 202. Such an understanding may be used to identify one or more objects that may present features and/or characteristics generally known to be suitable and/or otherwise preferable for hosting a projected image. Examples include, without limitation, suitability of an objects size, its overall shape as it relates to a boundary being well adapted for a projected image according to the content description. Other features may include a shading, a color, a texture, a distance and/or distance variation, positional stability, distance from a projector and/or from an intended viewer or audience, and so on.

In at least some embodiments, target source selection may be automated. Consider an implementation in which a projection processor receives the content description, and obtains an understanding of the physical objects, at least in relation to their suitability for presenting a target surface. The projection processor may then compare the one or more features which may include a status as to whether the features are present or absent and/or a comparison of any quantifiable features to predetermined suitability thresholds. In at least some embodiments, the projection processor may compare features of different objects, making a selection based on a predetermined logic that may identify a particular feature and/or combination of features as indicators of suitability.

Alternatively or in addition, target source selection may be based in whole or in part upon input from a user input device. For example, a user may observe an image of a proximal physical environment and choose one or more potential target surfaces. The target surface understanding at 202 may be referenced to determine whether the user identified surface(s) are suitable for hosting a projection of the content described at 201. As long as some minimum threshold of suitability is met by at least one of the user identified surfaces, then that surface may be selected as the target surface at 203. Alternatively or in addition, a user may be presented with a recommendation of one or more object surfaces suitable for hosting a projection of the content described at 201 based on the target surface understanding obtained at 202. The ultimate selection of the target surface at 203 may depend upon input from a user input device identifying a selected one or more of the target surfaces responsive to the recommendation.

A view adjustment may be applied to the content at 204 in preparation for projection of the adjusted content onto the one or more target surfaces. The content may be adjusted to accommodate various lighting conditions, surface boundaries and/or shapes, surface contours, and the like. Accordingly a representation of the content may be adjusted, such that when projected upon a physical surface of the target object, a resulting projection of the content satisfies an objective of the projection, e.g., text is readable, detail is visible, and one or more of sizes, shapes, colors, intensities and/or proportions of the content is preserved by the adjustment, regardless of the characteristics of the projection surface.

The view adjustment may include one or more adaptations to the image content adapted to enhance, improve and/or otherwise prepare the content for presentation on the target surface(s). View adjustments may include, without limitation, a resizing and/or reshaping of a projected image of the adjusted content that is adapted to a boundary of the one or more surfaces. Alternatively or in addition, view adjustments may include a warping of an image of the content based on a surface contour of the target surface(s). For example, the warping may be adapted to compensate for a distance variation to the projector along the target surface (s). The warping may be adapted to promote a uniform focus, size and/or proportion of the content across the target surface(s). Still other examples of view adjustments may include coloration, illumination intensity, focus, shading, texturing, and so on.

The view adjusted content may be provided to a projector for projection onto a surface of the target object(s) at 205. In some embodiments, a single projector may be used to project the adjusted content onto the target surface(s). Alternatively or in addition, more than one projectors may be adapted to collectively present the adjusted content onto the target surface(s). In at least some embodiments, the same and/or slightly shifted versions of the adjusted content may be projected from different angles and/or positions to cover target surface(s) that may be otherwise unable to host the projection from a single projector, e.g., due to a blockage and/or a shading. Alternatively or in addition, the content is further adjusted into complementary view adjusted content according to a number, angle, position and/or type of projectors. Accordingly, when the multiple complementary projects are projected on the target surface, the resulting combination presents an overall projection of the content according to a projection objective or goal.

It is envisioned that in at least some embodiments feedback may be employed to further adapt any adjustment of the content to improve and/or otherwise maintain a predetermined quality of the projection. For example, a camera sensor may be adapted to detect projections that extend beyond a delineated boundary of the target surface, sometimes referred to as "bleed over," to calibrate and/or error correct the image, e.g., by determining a characteristic of the error and further adapting the image to compensate and/or otherwise correct for the error. In at least some embodiments, such feedback may be employed to accommodate changing conditions of the physical environment, such as movement of the target object, obstruction of the target object, changes in lighting, and so on. Accordingly, such adjustments and readjustments may be used to present a coherent, understandable projection of the content, even under transient conditions of the physical environment.

By way of example, feedback may be applied, e.g., at 206, based on a projection of the adjusted image onto the target surface(s). For example, feedback may be adapted to identify an error signal, such as an error accounting for the projection of the adjusted image failing to match an available border of the target surface(s). Alternatively or in addition, feedback may include errors determined according to one or more of a lack of focus, a discoloration, an undesirable shading, texturing, and so on. An error signal may be derived from one or more errors determined according to the feedback, and applied to the content for further view adjustment, e.g., at 204. The further view adjustment may be adapted to compensate and/or otherwise reduce the error as may be determined by subsequent feedback at 206.

In some embodiments, feedback may identify an obstruction, e.g., movement of one physical object in a manner that inhibits, e.g., blocks projection of at least a portion of the adjusted image onto the target surface(s). The feedback may identify a presence of such an obstruction and in at least some embodiments, initiate a revisiting of the target surface understanding at 202. For example, a revising of the target surface understanding may evaluate a surface of an obstructing physical object that was not present within the proximal physical environment at a time at which the original target surface understanding was obtained at 202.

The target surface selection 203 may be reapplied to determine whether a different target surface, e.g., one not inhibited by the obstructing object, may be better suited in view of the obstruction. Alternatively or in addition, the target surface selection may select a re-sized and/or re-shaped portion of the original target surface(s) alone or in combination with at least a portion of a surface of the obstruction. For example, the target surface(s) may be resized and/or reshaped to avoid the obstruction. Alternatively or in addition, the target surface(s) may be extended to include at least a portion of the obstruction. The view adjustment may be reapplied at 204 to the content based on an updated understanding of the target surface(s), and projected onto the target surface(s) at 205.

In at least some embodiments, the process 200 may monitor at 207 for handoff opportunities. For example, the target surface understanding and target surface selection may be repeated after a projection of a view adjustment of the content has begun on the target surface(s). It is conceivable that a number, type and/or arrangement of physical objects of the environment may vary over time for various reasons. Accordingly, what may have been selected as perhaps the best available suitable target surface may have been replaced by another yet superior suitable surface. In such instances, the target surface selection may be adjusted at 203 to select the superior suitable surface as a new target surface. A transfer of an initial projection of the initial view adjusted content onto a first target surface may be made to a revised projection of a revised view adjusted content onto a new and/or different target surface. Other forms of transfer may include, without limitation, transfer of a projection from one projection device to another, transfer from a project from one group of projection devices to another group of projection devices and/or a replacement of all or at least a portion of a projection, with presentation of a corresponding portion of the content on an available display device, e.g., without projection.

FIG. 2B is a block diagram illustrating an example, non-limiting embodiment of an adaptive image projection system 210 functioning within the communication network of FIG. 1 in accordance with various aspects described herein. In at least some embodiments, the adaptive image projection system 210 may include a context, or projection objective determination module 211 adapted to detect, identify and/or otherwise determine a context or objective of a projection event. For example, the objective may be based upon an intention of a user as may be determined by an expressed intention received via user equipment, such as a user provided description and/or selection form among intention options received via a user interface. User input may be similarly obtained via a gesture as may be observed via a touchscreen or camera and/or a verbal que as may be received via a microphone. In at least some embodiments, the intention may be obtained from an earlier user preference, e.g., as expressed during a prior projection event and/or otherwise recorded in a user profile, and/or according to objectives of other viewers who may have previously projected the same source content and/or projected source content in the same or similar location or venue.

Alternatively or in addition, the objective of the projection event may be inferred, e.g., from a description of the content of the planned projection event, from an objective determined by other users who may have previously projected the same and/or similar content and/or from a day of the week and/or a time of the day alone or in combination with a scheduled calendar event. A description of the source content may be determined according to a title and/or file name of the source content, a source of the content, metadata as may be provided in association with the content. A description of the source content may include an indication whether the content includes text, images or some combination of both, whether the images are still or motion images, e.g., video images, a quality, a resolution, a color palette and the like.

In at least some embodiments, the objective of the projection event may be determined from an activity associated with the proximal physical environment, e.g., a library versus a theater, an auditorium, a gymnasium or some other public space, such as a public transportation system. A location may be determined according to geocoordinates as may be obtained from a geolocation receiver, an address and/or location upon a map, building and/or facility associated with a map location and/or address. By way of further example, an objective of the projection event may identify whether the event relates to entertainment, instruction, informational exchange, advertisements or branding, or perhaps some other category.

In at least some embodiments, the adaptive image projection system 210 may include a module adapted to determine a user intent associated with a projection, sometimes referred to as an objective determination module 211. The objective determination module 211 may be adapted to detect, identify and/or otherwise determine an aim, goal, or objective of a projection event. Determination of a goal may occur during a planning phase before a projection has begun, and/or responsive to an initiation of a projection event, e.g., user selection of content for projection, and/or at any time during a projection as an intention may shift for any number of reasons, such as a change in the source content, a change in the environment, an updated user input, e.g., selection of a new intention and/or feedback to a current projection. Such objectives include, without limitation, any of the examples disclosed herein, including entertainment, education, communication.

In other embodiments, the user intent determination module may indicate a context, such as a specific emotive expression of content. In one example for a theatrical production, the content description 201 indicates that the projected content contains visuals of clothing that would play back on one or more of the users (e.g., the selected target surface 203) that are acting in a play as a single family. In one example, with determination of user intent 211, the system determines that one user (e.g., a "parent" character and target surface 203) is expressing sad or particularly emotive movements and speech patterns. In another example a second user (e.g., a "child" character and second target surface 203) is expressing blissful ignorance with a smiling face and fast, high-pitched speech. The module 211, in combination with the description 201, detects these particular user intents and objectives and conveys them to subsequent stages of the system 210.

Stated more broadly, an understanding of one or more actors in a scene and/or dynamics of the actor(s) and/or other aspects of the scene may be identified, such that one or more modifications of source content may be adjusted, based on the understanding, to adapt the source content for projection onto one or more physical objects of a projection environment. Such modifications may extend beyond physical adjustments, e.g., based on a size, shape, orientation and/or texture of a projection target and/or alignment checks of a projection onto a target. For example, the modifications may include a selection of a one or more sub-portions of the source content for projection and/or modification of the source content, including modifications of any sub-portion (s), e.g., according to one or more of a size, a shape, a color, a texture, and/or a dynamic property. By way of example, a dynamic property may relate to how a modification of projected source content may respond to dynamic aspects of a physical object onto which the source content is projected. Consider a projection of a garment onto a physical actor in a dramatic scene. The garment may be a heavy material, such as a heavy cloak or leather. Such heavy garments may respond differently to movements of the actor than a lighter material, such as satin or silk. Accordingly, a portion of the source content corresponding to the garment may be adjusted to accommodate for a dynamic response of the actor, such that the projected image corresponds realistically to a physical movement of the actor onto which the image is projected.

The adaptive image projection system 210 may be adapted to accommodate and/or otherwise respond to inputs from other sources, such as other viewers and/or participants in a projection, e.g., by way of text messages, visual ques, audio comments, requests or commands. Alternatively or in addition, the adaptive image projection system 210 may adopt at least some aspects of a social media platform. For example, the adaptive image projection system 210 may determine social joins for adjacent users, e.g., singleton, community, peers, parents.

The example adaptive image projection system 210 also includes a surface determination or evaluation module 212. The surface evaluation module may be adapted to identify and/or otherwise distinguish physical objects as potential projection surfaces within a physical environment, e.g., within a projection range of a target projection device or system. The surface evaluation module 212 may receive inputs from one or more environmental sensors, including any of the examples provided herein, such as a digital camera and/or a ranging device. In at least some embodiments, the surface evaluation module 212 receives an indication of an objective of the projection event from the objective determination module 211.

It is envisioned that an intent, goal or objective of the projection event may have at least some bearing on a suitability of a surface. For example, if the projections are provided to support and/or otherwise enhance a theatrical projection, the surfaces may be selected according to their role in the production, e.g., an actor's face and/or wardrobe, a prop, a scenic component and so on. Such predetermined target surfaces may be catalogued according to size, shape, location and/or any other physical property, such as color, shading and/or reflectivity, to facilitate their location and evaluation by the surface evaluation module 212. Other situations may include information exchange, in which the projection objective may identify whether a projection serving the information exchange would be a local exchange, e.g., intended for a sole user, and/or a small group of nearby viewers, or whether the information exchange may be for some broader audience. Based on the determined objective, a suitable surface may be selected by the surface evaluation module 212, such as a relatively small and/or localized projection to a nearby object for private or semi-private viewing, versus a relatively large surface and/or distant for the projection source to support viewing by a wider audience.

By way of example, the surface evaluation module 212 may determine a spatial neighborhood of a user, and identify potential display surface(s) of physical objects within the spatial neighborhood. Potential display surfaces may include, without limitation, relative flat surfaces, such as a table, a wall, a window and/or other non-planar surfaces, including virtually any object that may be present within the spatial neighborhood and within a projection range of the projector. For example, a user may indicate that different parts of their own body, or another nearby individual may be utilized, e.g., to support makeup, costume changes, and the like.

The example adaptive image projection system 210 also includes a target surface understanding module 213, in communication with the surface evaluation module 212. The target surface understanding module 213 may evaluate surfaces of physical objects identified by the surface determination module. For example, the objects may be evaluated to identify and/or otherwise them, e.g., to distinguish a person from an inanimate object, such as a wall or a chair. In at least some embodiments, objects may be identified and/or otherwise distinguished automatically, e.g., by applying one or more of image pattern recognition, facial recognition, computer vision, machine learning, deep neural networks, and the like. By way of example, image and/or video analysis may be automated using tools, such as Amazon's Rekognition® automated image and video analysis tool, which applies deep learning technology to identify objects, people, text, scenes and/or activities in images and videos. The target surface understanding module 213 may automatically determine a mobility state of one or more of the identified objects, e.g., determining whether the surfaces are relatively static or likely to move. Physical properties, such as mass, density, inertia and/or other physical properties of the identified objects may be inferred and/or otherwise applied by the target surface understanding module 213 as may be useful in identifying and/or understanding a behavior of suitable target projection surfaces.

In at least some embodiments, the target surface understanding module 213 may apply one or more fabric simulation techniques, e.g., evaluating types of textiles or fabric as may relate to their suitability for hosting a projected image. For example, the target surface understanding module 213 may detect a fabric embedded with a substance, such as a microfiber, which may enhance presentation of a projection and/or enhance a certain type of projection. Evaluations of textiles may be accomplished automatically using image processing tools adapted for textile analysis, such as the Textile Classifier application for Android devices, offered by Ville Terävainen of Finland, which classifies weft and knot textiles in real time using a camera of a mobile device, by applying a custom AI model. Accordingly, the target surface understanding module 213 may analyze a surface fabric and adjust, enhance and/or otherwise optimize projection based on results of surface analysis, e.g., based on a type of fabric or material, including what may be embedded within the surface fabric or material.

By way of example a person may wear a matte white fabric, e.g., in anticipation of hosting a projection, as may occur within a theatrical production, or with user garments designed to offer specially adapted projection surfaces. A projection may be adjusted based on a type of clothing, e.g., according to different fabric and related material characteristics as may be determined by the target surface understanding module 213. Projected content may include simulations of fabric or material characteristics, e.g., employing computer graphics to adjust a projection to accommodate for performance of a fabric in motion, e.g., if worn by a person and person moves, anticipate fabric response—stiffness.

In at least some embodiments, one or more modules of the example adaptive image projection system 210 may employ machine learning or artificial intelligence (AI). For example, the surface determination module may accommodate aspects of machine learning, e.g., a deep neural network, trained to recognize objects and/or boundaries within images of the physical environment. Alternatively or in addition, aspects of machine learning, e.g., including deep neural networks, may be utilized by the target surface understanding module 213 to facilitate estimations of understandings of physical target surfaces from image and/or other sensor data.

In at least some embodiments, the example adaptive image projection system 210 includes a modification module 214. The modification module 214 may receive inputs from the surface evaluation module 212, e.g., identifying a target surface to host a projected image. The target surface may include surfaces of one or more physical objects within a physical environment. The modification module 214 may further receive inputs from the target surface understanding module 213, e.g., providing further details related to the target surface, such as physical properties of one or more objects providing the target surface. The modification module 214, in turn, may develop a strategy and/or plan for adapting content for projection upon the target surface.

In some embodiments, a view adjustment of the content may be implemented according to the plan, e.g., adjusting one or more of a size, a shape, a surface warping, an intensity, a color, and the like, of the content before projecting the content upon the target surface. Alternatively or in addition, the modification module 214 may develop more than one optional strategies and/or plans, e.g., when situations permit generation of such options. The multiple options may be presented to a user and/or viewer community for evaluation and comment. One of the options may be selected, e.g., responsive to user review and/or comment and, a view adjustment implemented according to the selected plan. In at least some embodiments, the multiple options may be evaluated automatically, e.g., according to a predetermined selection logic to choose a preferred one of the different options. Selection logic may be based upon user preferences, e.g., as expressed in a user profile. Alternatively or in addition, selection logic may be based upon prior user selections and/or according to an objective determined by the objective determination module 211.

Continuing the theatrical production example from above, module 214 has received objectives to modify the content projected onto one user (e.g., a "parent", and one surface 203) into a sad depiction and the content projected onto another user (e.g., a "child", another surface 203) into a happy depiction. These depictions and modifications may be derived from an explicit, pre-defined set of modifications (e.g., emotive, seasonal, period-centric, stylistic, etc.) or may be general (e.g., blurry, fast, adhering to fabric-based understanding 213, etc.). Further according to the illustrative example, each depiction has an accompanying modification strategy. For example, according to the strategy, a sad depiction may include overall darker and cooler colors, such as blue hints and heavily blurred edges, whereas a happy depiction may bias the color palette into brighter and/or more vibrant colors, such as pastels, and/or textures with whisp-like brush strokes, etc. In at least some embodiments, one or more of the modification strategies may be derived from one or more of a content description 201, a context, a user intent 211, a surface understanding 213, and any combination thereof. In at least some embodiments, several modification strategies may be evaluated, e.g., systematically and/or computationally, and combined into a modification proposal, e.g., a single modification proposal, for all content if the content description 201 and/or user intent 211 has higher-order motifs to satisfy (e.g., the overall scene is scary).

A selected modification proposal may be applied to the content to obtain view adjusted content that may be provided to a projection system 215 for projection upon one or more target surfaces 216. In at least some embodiments, the example adaptive image projection system 210 incorporates feedback obtained from a projection of the view adjusted content upon the target surface. Feedback may be applied to improve success of a projection event and/or to enhance an authenticity of a desired visual and/or audio display. In at least some embodiments, feedback may be obtained from the user, e.g., to enhance user engagement and adjustment of projection attribute, such as a brightness, color, size, and the like. Alternatively or in addition, feedback may be obtained from one or more monitoring devices, e.g., from one or more ambient cameras to the extent they may be available, to provide locational, positional and/or angular feedback to support optimization of the projection event for static and/or dynamic physical environments.

In yet another embodiment, feedback may also include a quality-based evaluation of the fitness or coverage of targets 203 of the physical environment versus the original content description 201. For example, if an entirety of a theatrical setting is planned to be projected to depict an inside of a scientific laboratory from the cinematic era of the 1920's, several extraneous elements, such as wall decorations (posters, images of the popular media of the time), background objects (like beakers, flasks, various reagents or electrical equipment), and foreground objects (tables, microscopes, scalpels) may be included in the content and its description 201—either as an entire video scape, a 360 video depiction, or multiple object-based representations.

In at least some embodiments, input may be obtained from a planned projection environment, e.g., in the form of feedback as may be obtained from a camera, a sensor, a description of an environment, e.g., a textual description and/or a map as may be obtained from a predetermined map reference, a computer vison algorithm and so on. In at least some embodiments, information about the environment, e.g., feedback, may be evaluated in view of a planned and/or an ongoing projection. It is envisioned that a planned and/or ongoing projection may be adapted according to feedback. The adaptations may include adjustments to one or more of a selection of a first portion of the source content for projection and/or a second portion of the source content inhibited from projection. Alternatively or in addition, the adaptation may include a selection of a portion of the physical environment, e.g., a physical item, such as a wall, a panel, a person, a piece of furniture, onto which a particular image, moving image, color and/or texture of the source content is projected. In at least some embodiments, a selection of the physical object from among a group of such objects may be made according to the projected content, e.g., according to its size, shape, location, surface features, texture, location, and the like.

According to the previous example, the feedback may determine that some of the wall decorations and/or foreground objects lack sufficient target surfaces 203 to be projected upon. In one embodiment, this may include results from the determination 212 and/or understanding 213 modules to indicate that no suitable surfaces were found. Alternatively or in addition, this may include results from one or more of the modification proposals 214 and surface projection 215 that indicate poor alignment of the desired content 211. In such instances, the target surface understanding system 213 may decide that certain objects or visuals should be excluded from projection 215 even though they were part of the original content description 201. In some embodiments, these objects may have been prioritized in the original content description 201 as background (non-essential, low priority) or foreground (essential, interactive, high priority). In other embodiments, e.g., based on user intent 211, the system may use target understanding 213 to exclude objects that the users are unlikely to interact with and may thus be excluded. In yet other embodiments, the projection surfaces 215 may have insufficient geometry to project the content—such as content with specific color effects attempting to project on a glass (mostly transparent) surface.

Considering an entirety of available content for projection, in at least some embodiments, some portion or subset of source content may be selected for projection, while leaving some other portion or subset of the source content may be selected for exclusion from projection. Without limitation, a selection as to which portion may be included and/or excluded from the projection may be based at least in part on a determination of an availability and/or otherwise suitability of an object or objects within a physical environment to accommodate a projection of the content. Suitability may include one or more of a size of a surface area of one or more projection objects, locations, orientations, arrangements within the physical environment, colors, textures, dynamics of the object(s) and so on. If no sufficient projection targets are available for an entirety of the source content, then the content may be adjusted to select a first portion of the source content for projection onto those projection targets that may accommodate the first portion, while a second portion of the source content, e.g., a remainder of the source content, may be selected for exclusion from projection. The analysis may be repeated during a projection presentation, such that the first and second portions may vary according to variations in the physical environment, the context and/or user intentions, e.g., adding and/or deleting content as may be the case.

In at least some embodiments, observations may be obtained for actors and/or objects within a scene projected onto physical objects of a projection environment. In some instances, the physical actors and/or physical objects presented with the projection environment may be observed, such that projected content may be adjusted based on the observations prior to projection. Observations may include automated observations of one or more of the actor's location, orientation towards the projector, dynamics, gestures, e.g., according to machine vision and/or machine learning, e.g., AI. Alternatively or in addition, the observations may include observations within the source content, e.g., observations of the actors and/or objects presented within source content intended for projection onto physical objects of the projection environment.

Adjustment may include any of the various adjustments disclosed herein, e.g., size, shape, location, color, lighting, texture, dynamics, and so on. In at least some embodiments, content adjustments and/or modifications may be implemented in an optimal sense, e.g., to optimize available projection surface area, to optimize with respect to a context and/or actions within a scene, e.g., dynamic aspects of the physical environment and/or content, and so on. More generally, adjustment of media content for projection onto objects within a physical environment may be implemented dynamically, e.g., allowing aspects of the content, e.g., in-scene objects, to interact dynamically with physical objects onto which the content is projected.

The feedback may be provided to one or more of the surface evaluation module 212, the target surface understanding module 213, the modification module 214. One or more of the recipient modules may perform reevaluations responsive to the feedback to obtain revised surface determinations, surface understandings and/or modification proposals. In some embodiments, the feedback may be used to identify refinements and/or corrections to the view adjusted content adapted to enhance, improve and/or otherwise correct projections on the target surfaces 216 to reduce errors. Alternatively or in addition, the feedback may be used to identify proposals for different target surfaces that may or may not overlap prior target surfaces. Any such revised proposals may be reevaluated and to the extent they are determined to be preferable, implemented to obtain revised view adjusted content that may be provided to the projection system 215 for projection onto the revised target surface. In at least some embodiments, the system may operate in an iterative manner.

In at least some embodiments, the example adaptive image projection system 210 may identify an opportunity to handoff a projection to one or more other devices 217. For example, the example adaptive image projection system 210 monitors for handoff opportunities. As traversing in a space, and/or responsive to other objects moving in and/or out of a proximate physical environment, the example adaptive image projection system 210 may query, detect, negotiate and/or reach out to any nearby display surfaces.

Handoffs may be completed, e.g., in which instances of a projection may be terminated in favor of a handoff to another presentation mode, such as an active display device. Alternatively or in addition, handoffs may be partial, in which instances a portion of a projection may be handed off to another presentation mode, such as an active display device, while another portion of the projection may be projected onto the target surface 216, or an adjusted target surface adapted to accommodate the partial handoff. Active displays may be provided as embedded displays, e.g., incorporated into part of a structure, such as a wall, and/or into clothing. Augment projections may be prepared in which a first portion of source content is projected onto object surface, while a second portion of the content is displayed on the active display, such that the overall presentation includes the first portion and the second portion in a cohesive and/or complementary manner. Example environments with active displays may include college campuses, work environments. In at least some embodiments, such environments may provide a portal and/or an app to facilitate such augmented projections or joint displays.

Some surfaces may be passive, such as any of the aforementioned physical objects. And, in at least some embodiments, target surfaces may include active surfaces, such as display devices, e.g., monitors, smart TVs, tablet devices, active billboards, smart phones, and the like. It is envisioned that one or more such active display devices may be available to serve a projection event. Accordingly, the surface evaluation module 212 may be adapted to identify any such active display surfaces as may be available within the spatial neighborhood. The evaluation may further determine whether such active display surfaces are available to participate in at least a portion of the projection event, including any identifying any access requirements as may be required and/or provisioning access to such surfaces. It is understood that at least some active display surfaces, although present and accessible, may not be necessary and/or otherwise available to support the determined projection objective. For example, an active display may be obstructed, or otherwise not properly positioned to support a projection surface, or if unobstructed, may not be sized and/or shaped to support the determined projection objective.

To the extent the surface evaluation module 212 selects an active display surface of a display device within a proximity of the projection environment, the selected display device may be driven by personal projector and use proximal personal surfaces, e.g., backs or chests, of nearby pedestrians. In some embodiments, a projected image may extend over a region that includes a passive and an active surface. In such instances, an optical projection from the projector device may be directed to the passive region(s) of the garget surface, excluding projections to the active region(s), e.g., by projecting little or no light upon the active surfaces, instead, providing at least a portion of a view adjusted image to the display device, permitting the display device to display the received portion in a manner in which the active and passive surfaces cooperate to present a coherent projected image.

It is envisioned that in at least some embodiments, an active display surface may be directed to display a particular color, intensity, pattern and/or image. In such instances, a view adjusted image may be projected on the passive and active surfaces, such that the active displayed content supplements and/or otherwise supports an overlapping portion of the projected image to support presentation of a coherent projected image across both of the active and passive surfaces.

The surface evaluation module 212 may analyze a surface for projection and/or display characteristics, e.g., using target surface for visualizations. Without limitation, such analysis may include any of the examples disclosed herein, including computer vision (CV) techniques, time-of-flight, patterns, e.g., projection of test pattern and/or structured light, inclusion of one or more fiducials, color saturation and/or visibility tests. The surface evaluation module 212 may characterize and/or otherwise evaluate, compare and contrast surfaces according to generally known reflectivity and/or refraction values, e.g., constants. The surface evaluation module 212 may rely on other surface features, such as size characterization, textural, density estimation for materials, e.g., a fabric or glass.

In at least some embodiments, the surface evaluation module 212 may use an object tracking capability, e.g., a human body tracking capability. The object tracking capability may identify, anticipate and/or otherwise predict deformation for expected surface movement, e.g., to modify adjustments of the source content to support projections on moving objects, such as clothes on an individual. The object tracking capability may provide details on an object's movement and/or anticipated movement, which may be considered in any select and/or otherwise avoidance some surfaces. For example, the tracking capability may identify physical window as moving or shaking, while a piece of furniture, such as a bench may be stable. The observed and/or otherwise anticipated movement of either object as may be discerned from the object tracking capability, may be considered during selection of a suitable target surface, such that the bench may be selected over the window. In at least some embodiments, the surface evaluation module 212 may determine if the surface is moving, and attempt to track such movements and possibly adjust for potential tracking error.

In at least some embodiments, a projection on a target surface is achieved from different angles, in which multiple projections are deployed to render different and/or desperate views of the content in a projection adapted for viewing by a group of observers. In at least some embodiments, the different views may be adapted to accommodate obstructions and/or to extend a viewing region, e.g., viewing angle, to a wider region or angle. Alternatively or in addition, the different views may include complementary views that collectively present an intended projection effect. Consider an example in which a first projector projects a yellow circle onto a TV, while a second projector projects a white triangle onto an overlapping region. The resulting composite projection produces an effect of a sun pictograph that may be observable from many angles.

FIG. 2C is a block diagram illustrating another example, non-limiting embodiment of an adaptive image projection system 220 functioning within the communication network of FIG. 1 in accordance with various aspects described herein. The adaptive image projection system 220 includes a projection processor 222 in communication with one or more sensors 223 and one or more image projectors 224. The projection processor 222 receives content, e.g., in the form of a digital objection, such as a textual file and/or an original image 227. In at least some embodiment, the adaptive image projection system 220 also includes a user interface 221 that may be adapted to facilitate operation of the adaptive image projection system 220. The sensor(s) 223 and the image projector(s) 224 are positioned proximal to a physical environment 225 within a projection range of the image projector(s) 224. The projection processor 222 identifies a target surface within the proximal physical environment 225, determines an understanding of the target surface and modifies the content, e.g., the original image 227 to obtain a modified image 228, responsive to the identification and understanding obtained for the target surface. The modified image 228 is adapted for projection onto the target surface, to provide a projected image presenting a coherent and understandable presentation of the original image 227 to a viewer observing the projection of the adjusted image upon the target surface.

The sensor(s) may include a digital camera, e.g., a traditional RGB digital camera, or a digital camera adapted to record a distance or depth to a captured image, sometimes referred to as an RGB-D camera. Sensors may include any of the various sensors disclosed herein or otherwise known for sensing information from a physical environment, such as laser range sensors, time-of-flight sensors, and the like. In at least some embodiments, the sensors may include biometric sensors, e.g., adapted to measure one or more biometric parameters of a user. Biometric sensors may include, without limitation, heat sensors, salinity sensors, moisture sensors, heart-rate and/or pulse sensors, blood oxygen sensors, acoustic sensors adapted to record user noises, including verbal and non-verbal utterances, and the like. By way of example, biometric data may be used in support of determining a projection objective, e.g., user intent, target surface selection, view adjustment, and/or feedback.

According to the illustrative example, the proximal physical environment 225 includes a wall 226a, a door 226b and an individual's shirt 226c. The door 226b is located along the wall 226a and the shirt 226c is positioned in front of a portion of the wall 226a, i.e., obstructing and/or otherwise blocking a corresponding portion of the wall 226a. It is understood that the sensor(s) 223 may capture an image of the proximal environment 225 that portrays at least portions of the wall 226a, the door 226b and the shirt 226c. The captured image may be supplemented with other information as may be available from the sensor(s) 223, such as depth information, thermal information, and the like. The sensor information, including the captured image, may be provided to the projection processor 222 that operations according to the techniques disclosed herein to identify a target surface.

It is understood that the target surface may include portions of one or more of the wall 226a, the door 226b and the shirt 226c. The projection processor 222 may evaluate the sensor data alone or in combination with supplemental information, such as characteristic features and/or properties of generally known surfaces and/or according to machine learning and/or AI techniques, to obtain an understanding of the target surfaces 226a, 226b, 226c, generally 226. In at least some embodiments, the surface understandings may be utilized to select a preferred target surface, e.g., selecting a region of the wall 229 that is unobstructed by either the door 226b or the shirt 226c. Other selections may include the door 226b and/or the shirt 226c, e.g., as may be useful in projecting a costume, or other icon or image, e.g., a color and/or an emoticon as may be indicative of a user's mood. Still other target surfaces may include overlap portions of more than one of the wall 226a, the door 226b and the shirt 226c.

In at least some embodiments, the projection processor is adapted to view adjust the source or original image 227 to obtain a view adjusted, or modified image 228 in view of any understandings of the target surface(s) that may have been obtained. An example adjusted image 230 is provided for an example target surface that includes the entire wall 226a, the door 226b and the shirt 226c. In anticipation of projection, the adjusted image 230 may adjust one or more of a color, an intensity and a warping according to the understandings of the various physical objects that make up the target surface. To the extent the wall is brighter than the door, that portion of modified image 228 corresponding to the door 226b may be projected at a greater intensity than that portion of the modified image 228 that corresponds to the wall 231a compared to that portion corresponding to the door 231b. Similar intensity and/or color adjustment may be made for that portion of the adjusted image 230 corresponding to the shirt 231c. Additionally, as the shirt 226c is not as flat as the wall 226a or the door 226b, that portion of the modified image 228 corresponding to the shirt 231c may be warped according to detected and/or otherwise estimates surface contours of the shirt 226c. Thus, straight lines in the original image 227 may be pre-warped in the modified image 228 to accommodate for the surface contours, such that a projection of the warped straight lines would appear as straight lines when projected across the shirt 226c.

In some embodiments, individuals present within the proximal physical environment may opt in and/or opt out of participating in a projection event. To the extent the individual wearing the shirt 226c may have opted out, such information may be provided to the projection processor 222, e.g., by way of a user input and/or participant status indicator. Accordingly, the modified image 228 may be prepared to avoid projections upon the individual who opted out, e.g., selecting a target surface that does not overlap the opting out individual. Alternatively or in addition, the modified image 228 may project an image that includes the opting out individual. That image may include dark light and/or an image portion overlying the individual, e.g., the shirt 226, adapted to deemphasize a presence of that individual. In at least some instances, the projections may include a diminished reality to deemphasize and/or otherwise remove an object appearing within the target surface region from a projection directed toward the target surface.

FIG. 2D is a block diagram illustrating, in more detail, an example, non-limiting embodiment of a projection processor 240, as the example projection processor 222 functioning within the adaptive image projection system of FIG. 2C in accordance with various aspects described herein. The projection processor 240 includes a user interface 241, a contextual evaluator 242, a surface evaluator 246, an object delineator 244, a target surface(s) selector 248 and a projection image(s) adjuster 249.

The user interface 241 is in communication with the contextual evaluator 242 and optionally with the target surface(s) selector 248. The user interface 241 is adapted to receive a user input and to provide an indication of a user input to the contextual evaluator 242 and optionally to the target surface(s) selector 248. The contextual evaluator 242, in turn, may receive inputs form one or more other sources, such as the sensors 223 (FIG. 2C) and/or an output of a content description evaluator, e.g., providing a description of the content as may be obtained from metadata and/or any of the other example content description techniques disclosed herein or otherwise generally known.

The contextual evaluator 242 is adapted to identify and/or otherwise infer a context associated with a projection event. The context may include an expressed and/or inferred user intention. Alternatively or in addition, the contextual evaluator 242 may infer a context, at least in part, according to a purpose, function, and/or operator of a venue associated with the proximal physical environment, as may be determined according to a locational input, such as a geocoordinate, an address, a facility and/or related entity identification and so on. Other inputs that may contribute to the contextual evaluator 242 determining a context may include calendar inputs, e.g., scheduled events, user identities of projection participants, observers, or others in or near the proximal physical environment. Still other inputs may include microphones and audio processors adapted to process audio signals obtained via the microphones. Results of the audio processing may include speech processing and or voice signature recognition to determine intelligible content and/or user identities that may provide an indication of the venue and/or participants as that may be relevant to determining a context.

The object delineator 244 receives input from one or more environmental sensors that may include an image sensor or camera. The object delineator 244 may process an image of the proximal physical environment to identify lines, curves and/or shapes as they may relate to boundaries of physical objects present at the proximal physical environment. In at least some embodiments, the object delineator 244 is in communication with the surface evaluator 246, e.g., providing indications of the delineated objects that may include boundaries and/or other features that may be relevant to determining an understanding of the surface(s).

The surface evaluator 246 may receive inputs from one or more environmental sensors that may include the image sensor or camera, e.g., the same image(s) as may have been provided to the object delineator 244. The environmental sensor data, including any images, are generally directed to the proximal physical environment from which one or more target surfaces will be selected to host a projection of source content. The surface evaluator 246 is adapted to process sensor input alone and/or in combination with an indication of any delineated objects, to determine an understanding of the various surfaces. Such an understanding may include estimations of surface colors, shapes, distances, orientations, contours, textures, hardness, firmness, flexibility, density, and the like.

The example target surface(s) selector 248 is in communication with the contextual evaluator 242, the surface evaluator 246, the object delineator 244, and optionally with the user interface 241. The target surface(s) selector 248 receives inputs from the contextual evaluator 242 and/or optionally from the user interface 241, e.g., identifying a context, objective or intent of a projection event. The target surface(s) selector 248 may also receive indications from the object delineator 244 of any delineated objects portrayed in an image of the proximal physical environment. Likewise, the target surface(s) selector 248 may receive indications of any understandings of surfaces of the delineated objects as may have been determined by the surface evaluator 246. The target surface(s) selector 248 may select one or more of surfaces of the delineated objects as a target surface to host a projection of the source content. Alternatively or in addition, the target surface(s) selector 248 may generate proposals of one or more target surface for further evaluation and or user selection. Any such proposals may be presented to the user via the user interface 241, which may be further adapted to receive a user selection of a preferred one of the identified proposals, and provide an indication of the user selection to the target surface(s) selector 248.

The target surface(s) selector 248 provides an indication of a selected target surface to the projection image(s) adjuster 249, which may receive inputs from one or more of the surface evaluator 246 and the object delineator 244. The projection image(s) adjuster 249 also receives source content to be adapted for projection upon the selected target surface, and optionally a description from the content according to any of the various techniques disclosed herein, including via any metadata that may be provided with the source content and/or user description provided via the user interface 241.

The projection image(s) adjuster 249 adjusts the source content in preparation for projection upon the target surface. Adjustments may be based on objects and/or surfaces encompassed within the target surface indicated by a selection provided by the target surface(s) selector 248. Adjustments may be based further upon one or more of the delineated shapes provided by the object delineator 244, e.g., by sizing, shaping, stretching the original content to fill a boundary of the target surface. Alternatively or in addition, adjustments may be based further upon surface evaluations provided by the surface evaluator 246. Adjustments based on surface evaluations may include, without limitation, recoloring, re-shading, adjusting intensities, warping, and the like.

In at least some embodiments, the projection image(s) adjuster 249 provides results of a projection image adjustment, to the user interface, e.g., as a proposal. The projection image(s) adjuster 249 next provides the adjusted image to a projector adapted to project the adapted image onto the target surface.

FIG. 2E through 2G are block diagrams illustrating example, non-limiting embodiment of local, adaptive roadway image projection systems 250a, 250b, 250c, generally 250, functioning within the communication network of FIG. 1 in accordance with various aspects described herein. A first example roadway image projection system 250 provide a stationary camera 253a, e.g., at or near a known obstruction, such as a blind turn, a tunnel, or hill, or in a location subject to heavy traffic, in which visibility may be impaired by large vehicles, e.g., tractor-trailers. The stationary camera 253a obtains an image providing a clear view ahead along the roadway, and projects the image, e.g., via wireless link 255a, to a projection adaptation system 254a deployed within a vehicle 252a. The image services as source content to the projection adaptation system 254a, which operates according to the various techniques disclosed herein to delineate objects, to understand surfaces of the delineated objects and to propose and/or otherwise select a target surface well suited to host a projection of the source content.

According to the illustrative example, a truck 251a may provide an obstruction blocking an extended view of the roadway to the vehicle 252a. The projection adaptation system 254a may obtain an image of approximal environment that may include the truck 251a and other surfaces, such as a billboard 256a, or building. The projection adaptation system 254a may identify one of the other surfaces, e.g., a rear surface of the truck 251a, as a target surface, adapting the source image as appropriate and projecting the adapted image onto the truck 251a to effectively provide an operator of the vehicle 252a with a "superpower" see an extended view of the roadway, as though the obstruction, i.e., the truck 251a, were not present.

In another configuration, a large vehicle, e.g., the truck 251b, likely to obstruction roadway views to other vehicles, e.g., the vehicle 252b, may be outfitted with a camera 253b. The camera 253b may be positioned and operated to capture images of a roadway in front of the truck 251b and broadcast the images, e.g., via wireless link 255b, to other vehicles, such as the vehicle 252b behind the truck. The vehicle 252b may include a projection adaptation system 254b deployed within a vehicle 252a. According to the illustrative example, the projection adaptation system 254b may obtain the image of approximal environment that may include the truck 251b and other surfaces, such as a billboard 256b, or building. The projection adaptation system 254b may identify one of the other surfaces, e.g., a rear surface of the truck 251b, as a target surface, adapting the source image as appropriate and projecting the adapted image onto the truck 251b to effectively provide the operator of the vehicle 252b with an ability to observe the roadway ahead, as though the obstruction, i.e., the truck 251b, were not present.

In yet another example configuration, a large vehicle, e.g., the truck 251c, may be outfitted with a camera 253c positioned and operated to capture images of a roadway in front of the truck 251c. The truck 251c may include a projection adaptation system 254c that obtains the source roadway image from the camera 253c, e.g., via a communication link 256, and projects the image onto another surface visible to vehicles behind the truck 251c. Surfaces may include a billboard 256c, a building and/or rear surface of the truck 251c. Once again, the projected image effectively provides the operator of the vehicle 252c with an ability to observe the roadway ahead, as though the obstruction, i.e., the truck 251c, were not present. In at least some embodiments, similar projections onto other vehicles and/or on nearby roadway surfaces may provide guidance, alerts, information, and the like.

Figure 2H:
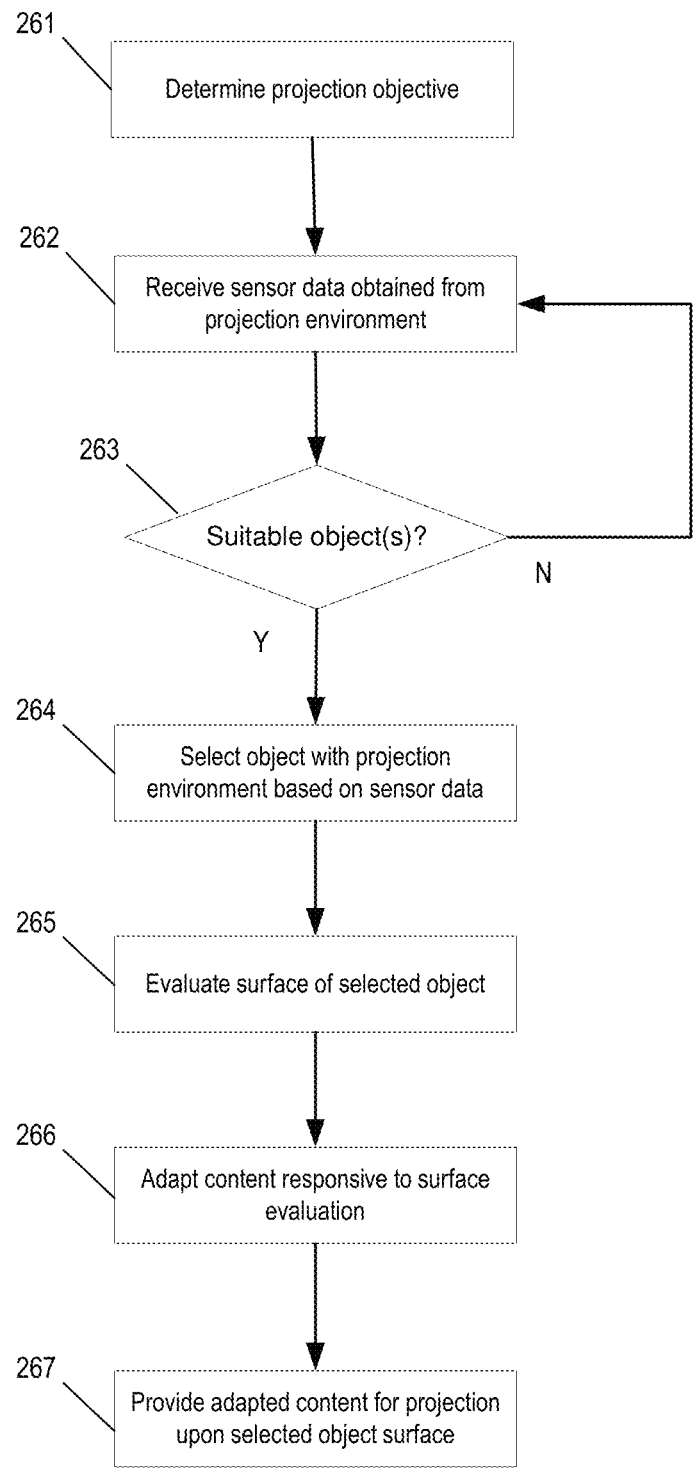
FIG. 2H depicts an illustrative embodiment of a local, adaptive image projection process in accordance with various aspects described herein.

FIG. 2H depicts an illustrative embodiment of a local, adaptive image projection process 260 in accordance with various aspects described herein. The example adaptive image projection process 260 determines a projection objective at 261. Sensor data that include data obtained from a projection environment is received at 262. A determination is made at 263 as to whether any physical objects present within the projection environment may serve as target surfaces for a projection of source content. To the extent no surfaces are available within the projection environment, the adaptive image projection process 260 may repeat, by receiving subsequent sensor data at 262 and evaluating the subsequent sensor data to identify any physical objects that may serve as target surfaces at 263. To the extent that one or more surfaces were identified at 263, a selection of an object within the projection environment is made at 264, based on the sensor data. A surface of the selected object is evaluated at 265 to obtain an understanding of the surface. The source content is adapted at 266 according to the understanding of the surface to obtain adapted source content. The adapted source content is provided to a projector at 267 for projection upon the selected target surface.

Figure 2I:
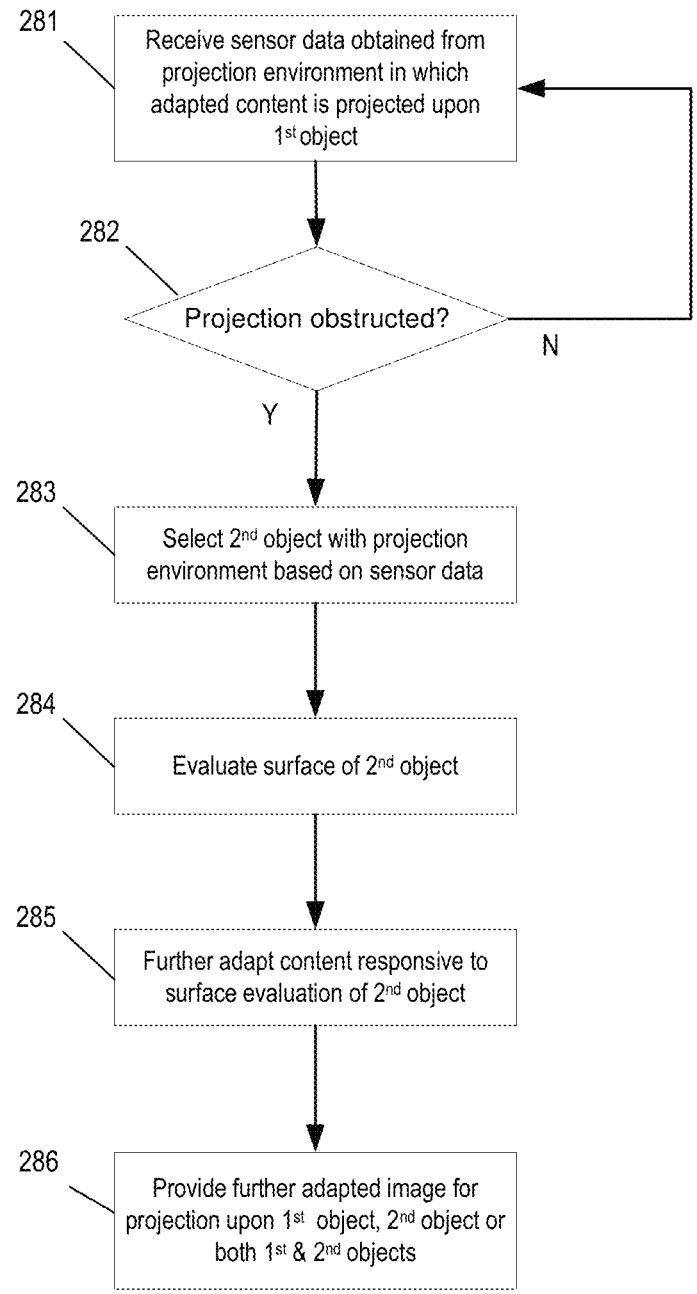
FIG. 2I depicts an illustrative embodiment of another local, adaptive image projection process in accordance with various aspects described herein.

FIG. 2I depicts an illustrative embodiment of another local, adaptive image projection process 280 in accordance with various aspects described herein. The example adaptive image projection process 280 receives, at 281, sensor data obtained from a projection environment in which adapted content is projected upon a first object, serving as at least a portion of a target projection surface. A determination is made at 282 as to whether the ongoing projection is obstructed. To the extent no obstructions are observed, the adaptive image projection process 280 may repeat, by receiving subsequent sensor data at 261 and evaluating the subsequent sensor data at 282 to identify any obstructions. To the extent that an obstruction is identified at 282, a selection of a second object within the projection environment is made at 283, based on the sensor data. A surface of the second object is evaluated at 284 to obtain an understanding of a surface of the second object. The source content is further adapted at 285 according to the understanding of the surface of the second object to obtain adapted source content. The adapted source content is provided to a projector at 286 for projection upon the first object, the second object or both.

While for purposes of simplicity of explanation, the respective processes are shown and described as a series of blocks in FIGS. 2H and 2I, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
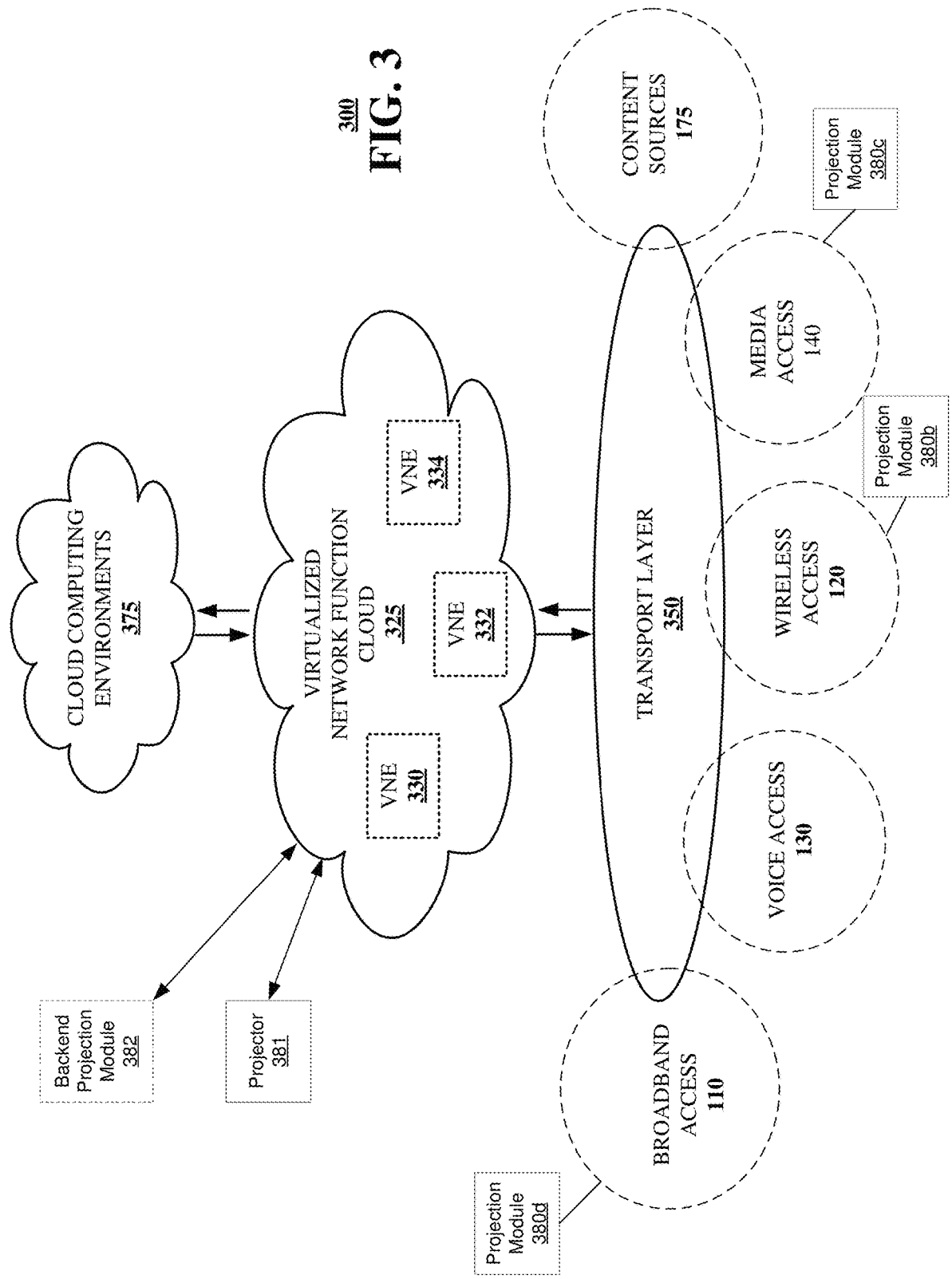
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of systems 210, 220, 240, 250*a*-250*c* and processes 200, 260, 280 presented in FIGS. 1, 2A-2I and 3. For example, virtualized communication network 300 can facilitate, in whole or in part, selecting an object within a local environment, characterizing a surface feature of the selected object, and adapting source content according to the characterization of the surface feature, wherein a projection of the adapted source content is formed by an illumination of the surface feature by the image projector.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

The illustrative virtualized communication network 300 further includes one or more projection modules 380a, 380b, 380c, 380d, generally 380, adapted to evaluate sensor data obtained from a proximal physical environment, to automatically identify and/or otherwise characterize physical objects present at the proximal physical locations, and to select at least one of the physical objects as a suitable host for accommodating upon its surface a projection of a media content item. In at least some embodiments, the projection modules 380 adapt the media content according to one or more physical properties of a surface of the selected physical object, such that an irregularity of the surface, e.g., a boundary shape, a lighting, a color, a texture and/or a variation in physical distance and/or focal length from the projector, may be compensated for prior to projection of the adjusted media content. In at least some embodiments, the projection modules 380 may include an error detection and/or correction capability to improve a projection of an adjusted image based on observed errors. Likewise, in at least some embodiments, the projection modules 380 may be adapted to select the target object and/or adjust the media content for projection thereupon based on a mobility state, e.g., stationary, moving, warping, and/or some other alteration of a physical characteristic of the target object, such as a change in lighting, shadow, obstruction, and the like.

In at least some embodiments, a projection module 380 may include a self-contained system adapted to process information received from one or more cameras and/or other environmental sensors, to process the input as appropriate in view of the media content and/or an objective of the projection event, and to provide an adjusted image to a projector 381 adapted to project the adjusted image onto a selected physical object within a proximal physical environment. Alternatively or in addition, the projection module 380 may be adapted to cooperate with one or more other devices and/or systems. By way of illustrative example, a backend projection module 382 may be provided at a remote location, distant from the proximate physical environment, but in communication with a local projection module 380, e.g., according to a client-server model, and/or as a network-hosted, and/or as an over-the-top service. One or more of the projection modules 380 and/or the backend projection module 382 may be hosted by and/or otherwise implemented in whole or in part by the virtualized network function cloud 325 and/or the cloud computing environments 375

Figure 4:
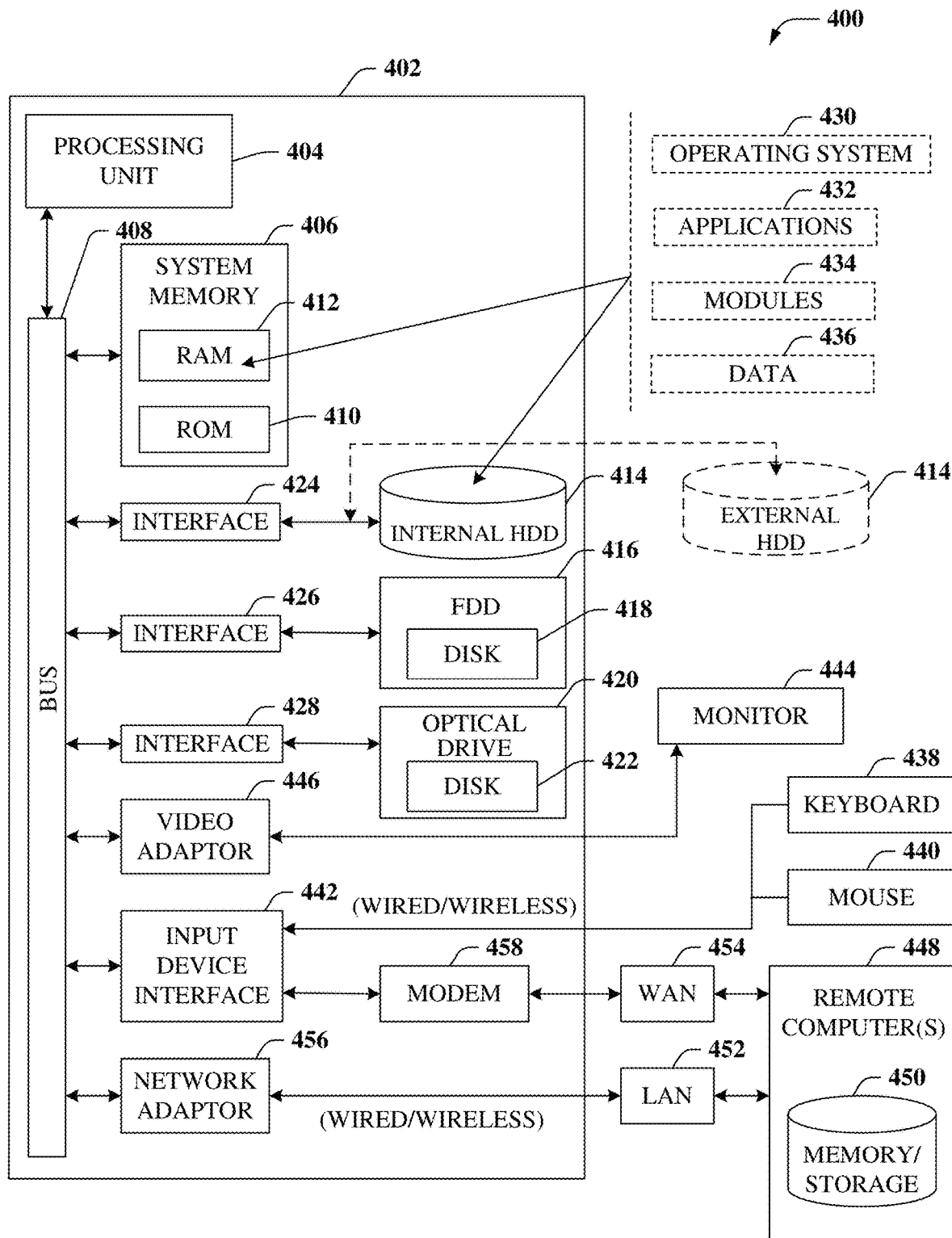
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, selecting an object within a local environment, characterizing a surface feature of the selected object, and adapting source content according to the characterization of the surface feature, wherein a projection of the adapted source content is formed by an illumination of the surface feature by the image projector.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
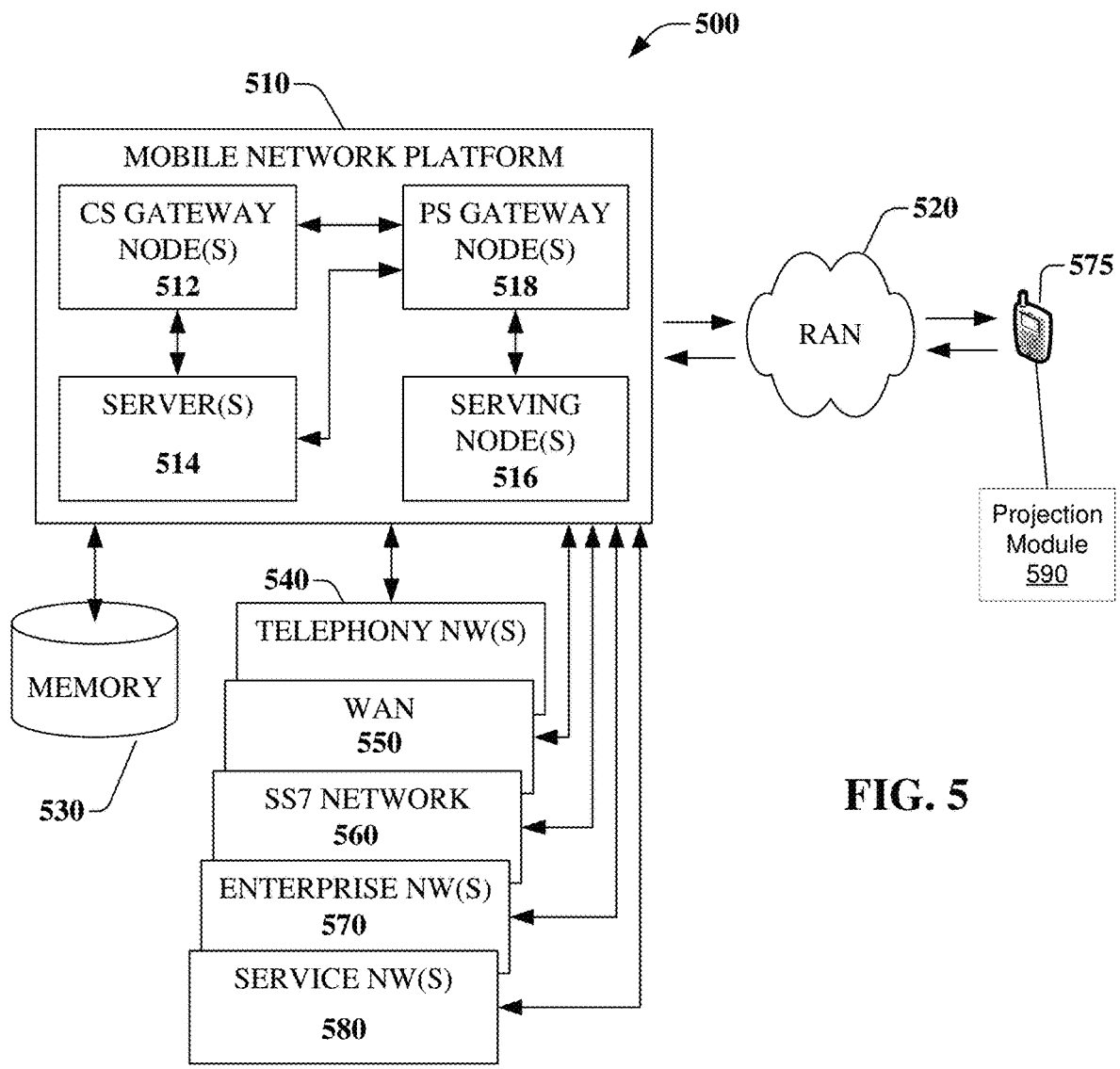
FIG. 5 is a block diagram of an example, non-limiting embodiment of a mobile network platform in accordance with various aspects described herein.

Turning now to FIG. 5, a mobile embodiment 500 of a mobile network platform 510 is shown that is an example of network elements 150, 152, 154, 156, and/or VNEs 330, 332, 334, etc. For example, platform 510 can facilitate, in whole or in part, selecting an object within a local environment, characterizing a surface feature of the selected object, and adapting source content according to the characterization of the surface feature, wherein a projection of the adapted source content is formed by an illumination of the surface feature by the image projector. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

The illustrative mobile embodiment 500 further includes a projection module 590, adapted to evaluate sensor data obtained from a proximal physical environment, to automatically identify and/or otherwise characterize physical objects present at the proximal physical locations, and to select at least one of the physical objects as a suitable host for accommodating upon its surface a projection of a media content item. In at least some embodiments, the projection modules 590 adapt the media content according to one or more physical properties of a surface of the selected physical object, such that an irregularity of the surface, e.g., a boundary shape, a lighting, a color, a texture and/or a variation in physical distance and/or focal length from the projector, may be compensated for prior to projection of the adjusted media content. In at least some embodiments, the projection modules 590 may include an error detection and/or correction capability to improve a projection of an adjusted image based on observed errors. Likewise, in at least some embodiments, the projection modules 590 may be adapted to select the target object and/or adjust the media content for projection thereupon based on a mobility state, e.g., stationary, moving, warping, and/or some other alteration of a physical characteristic of the target object, such as a change in lighting, shadow, obstruction, and the like.

In at least some embodiments, the projection module 590 may include a self-contained system adapted to process information received from one or more cameras and/or other environmental sensors, to process the input as appropriate in view of the media content and/or an objective of the projection event, and to provide an adjusted image to a projector 381 (FIG. 3) adapted to project the adjusted image onto a selected physical object within a proximal physical environment.

Figure 6:
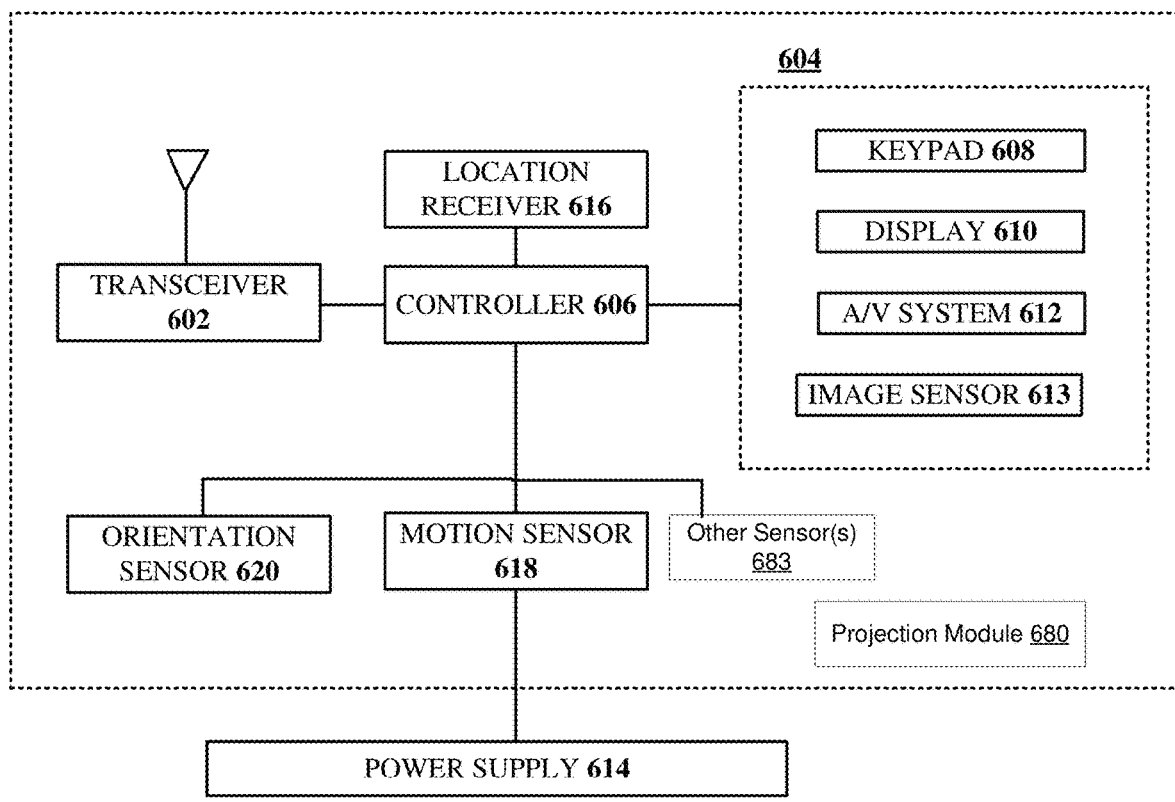
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate, in whole or in part, selecting an object within a local environment, characterizing a surface feature of the selected object, and adapting source content according to the characterization of the surface feature, wherein a projection of the adapted source content is formed by an illumination of the surface feature by the image projector.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The illustrative communication device 600 further includes one or more other sensors 683 and a projection module 680. The projection module 680 is adapted to evaluate sensor data obtained from a proximal physical environment, to automatically identify and/or otherwise characterize physical objects present at the proximal physical locations, and to select at least one of the physical objects as a suitable host for accommodating upon its surface a projection of a media content item. In at least some embodiments, the projection module 680 adapt the media content according to one or more physical properties of a surface of the selected physical object, such that an irregularity of the surface, e.g., a boundary shape, a lighting, a color, a texture and/or a variation in physical distance and/or focal length from the projector, may be compensated for prior to projection of the adjusted media content. One or more of the physical properties may be identified and/or otherwise determined according to the one or more sensors 683, e.g., including one or more of an image sensor, a light intensity sensor, an infrared sensor, a depth and/or distance sensor, a position and/or location sensor, and the like. In at least some embodiments, the projection module 680 may include an error detection and/or correction capability to improve a projection of an adjusted image based on observed errors. Likewise, in at least some embodiments, the projection module 680 may be adapted to select the target object and/or adjust the media content for projection thereupon based on a mobility state, e.g., stationary, moving, warping, and/or some other alteration of a physical characteristic of the target object, such as a change in lighting, shadow, obstruction, and the like.

In at least some embodiments, the projection module 680 may include a self-contained system adapted to process information received from one or more cameras and/or other environmental sensors, to process the input as appropriate in view of the media content and/or an objective of the projection event, and to provide an adjusted image to a projector 381 (FIG. 3) adapted to project the adjusted image onto a selected physical object within a proximal physical environment.

Beneficially, ubiquitous displaying may be achieved by an active projection of media content onto a variety of different physical surfaces. Image enhancement and/or optimization, by way of adaptations, may be accomplished, at least in part, based on estimations of surface materials of the physical objects, motions of the physical objects, and in at least some embodiments, an objective of a projection event, e.g., as may be determined according to a user context and/or intention as expressed by the user and/or otherwise inferred, e.g., from a feature of the media content. Fast and accurate surface detection and deformation estimation may be implemented using one or more of computer vision, deep learning and/or fabric simulation techniques. In at least some embodiments, a contextual awareness and/or personalization of the projections may be supported by a real-time fusing of information obtained from one or more of the underlying media content, the proximal physical environment, one user profiles, activities and/or marketing campaigns. Immersive experiences may be achieved by a blending of digital images on top of physical surfaces that, in at least some embodiments, may be provided with an extensible capability to be consumed through augmented reality devices, e.g., AR glasses, for additional effects.

It is envisioned further that advertisements may be inserted int and/or otherwise projected along with any adjusted source content. Advertisements may provide a source of revenue offsetting costs associated with installing and/or operating any of the various example projection adaptation systems disclosed herein. In at least some embodiments, the advertisements themselves may serve as source content, with a context and/or objective of the projection being presentation of the advertisement. For example, a user may host an application program or app on their mobile device adapted to generate loyalty points and/or revenue, by utilizing the user's device alone or in combination with other systems, to project advertisements upon surfaces of opportunity. Certain parameters of the ad presentation may be monitored, such as a size of the advertisement, an estimation of viewers within a viewing range of the ad presentation, e.g., as determined from an image of the proximal environment, and/or mobile operator records associating other mobile users with the proximal environment and/or identifications of other users as may choose to opt into such an advertising service, perhaps also receiving loyalty points and/or other incentives by virtue of their being exposed to such advertisements.

In at least some embodiments, adjustments and/or readjustments or corrections may employ augmented and/or diminished reality concepts. Such concepts may be adapted to change and/or otherwise alter a target projection surface, e.g., for a purposes of changing an overall look and/or feel as may be beneficial to adapt the surface by way of the adapted projection, to reflect an intended changes. For example, light of a certain intensity and/or color and/or pattern may be projected upon a target projection surface to deemphasize the physical object's prominence within the projection environment. Consider a dark light, a background color and/or camouflage pattern projected upon one object to facilitate a blending in of the object with the physical environment. In at least some scenarios, a projection may include an image of what would otherwise be visible were the object not physical present, e.g., what would appear on an opposite side of the object from the projector.

In at least some embodiments, adaptation of source content in preparation for projection may apply one or more adjustments to accommodate a context and/or user intention. Such adjustments may include, without limitation, application of one or more filters. The filters may be adapted to adjust for a look and/or feel of the projected content, e.g., by adjusting one or more of a color, an intensity, a lighting, a focus and/or intentional lack of focus or blurring. To the extent the context is historical, a filter may be applied to adapt the source content and/or at least some portions of the proximal physical environment to appear to be associated with a particular location, e.g., country or culture, and/or with a particular time period, e.g., "historical."

In at least some embodiments, the projections are provided in association with an interactive surface, e.g., projecting a control and/or control interface onto the target surface. One or more sensors, such as the camera used to obtain an image of the proximal physical environment, may monitor interactions of a user with a projected control surface, e.g., estimating a user selection or key press by gesture in relation to the projected control image.

The example systems and processes disclosed herein may be adapted to apply one or more transforms, e.g., flipping, mirror and orthographic projections, e.g., non-linear warping to new shape surface, to facilitate generation and/or interpretation of adjusted projections.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:

receiving, by a processing system including a processor, sensor data comprising an image of a projection environment;

identifying automatically, by the processing system, a plurality of physical objects of the projection environment portrayed within the image;

evaluating, by the processing system, the plurality of physical objects to obtain an evaluation of the physical objects, wherein the evaluating the plurality of physical objects of the plurality of physical objects comprises identifying, by the processing system, a plurality of motion indicators for the plurality of physical objects, the evaluation comprising the plurality of motion indicators;

selecting, by the processing system, a first target object of the plurality of physical objects according to the evaluation of the physical objects, a first projection surface comprising a surface of the first target object, wherein the selecting the first target object is according to the plurality of motion indicators;

adjusting, by the processing system, a source image according to the first projection surface to obtain a first adjusted source image; and providing, by the processing system, the first adjusted source image to a projection system adapted to project the first adjusted source image onto the first projection surface.

2. The method of claim 1, further comprising:
identifying, by the processing system, a projection objective for projecting the source image onto the first projection surface, wherein the selecting the first target object of the plurality of physical objects is further according to the projection objective.

3. The method of claim 1, wherein the evaluating the plurality of physical objects further comprises identifying, by the processing system, a plurality of boundary shapes of the plurality of physical objects, wherein the selecting the first target object is according to a first boundary shape of the first target object, and wherein the adjusting the source image further comprises reshaping, by the processing system, the source image according to the first boundary shape of the first target object.

4. The method of claim 1, further comprising:
evaluating, by the processing system, the source image to obtain an evaluation of the source image, wherein the selecting of the first target object of the plurality of physical objects is further according to the evaluation of the source image.

5. The method of claim 1, wherein the evaluating the plurality of physical objects comprises evaluating a dynamic aspect of a physical object of the plurality of physical objects, and wherein the adjusting the source image is further according to the dynamic aspect of the physical object to obtain the first adjusted source image.

6. The method of claim 1, wherein the adjusting the source image further comprises excluding a portion of the source image according to the evaluation of the physical objects.

7. The method of claim 1, further comprising:
determining, by the processing system, a context, wherein the adjusting the source image is further according to the context.

8. The method of claim 7, wherein the context comprises a context of a physical scene of the projection environment, a context of a physical object within the physical scene, a context of the source image, or any combination thereof.

9. The method of claim 1, wherein the evaluating the plurality of physical objects further comprises identifying, by the processing system, a plurality of surface warpages of the plurality of physical objects, wherein the selecting the first target object is according to a first surface warpage of the first projection surface, and wherein the adjusting the source image further comprises warping, by the processing system, the source image according to the first surface warpage of the first projection surface.

10. The method of claim 1, wherein the plurality of motion indicators includes at least an indication of whether the first target object is stationary or moving.

11. The method of claim 1, wherein the adjusting the source image further comprises adjusting, by the processing system, the source image according to a first surface texture of the first target object.

12. The method of claim 11, wherein the evaluating the plurality of physical objects further comprises identifying, by the processing system, a plurality of surface textures of the plurality of physical objects, wherein the selecting the first target object is according to the first surface texture of the first target object.

13. The method of claim 1, wherein the source image and the first adjusted source image comprise a still image, a video image, or a combination thereof.

14. The method of claim 1, further comprising:
selecting, by the processing system, a second target object of the plurality of physical objects according to the evaluation, a second projection surface comprising a surface of the second target object; and
adjusting, by the processing system, the source image according to the second projection surface to obtain a second adjusted source image.

15. The method of claim 14, further comprising:
substituting, by the processing system, the providing the first adjusted source image to the projection system with providing the second adjusted source image to the projection system, the projection system further adapted to project the second adjusted source image onto the second projection surface.

16. The method of claim 14, further comprising:
supplementing, by the processing system, the providing the first adjusted source image to the projection system with providing the second adjusted source image to the projection system, the projection system adapted to further project the second adjusted source image onto the second projection surface.

17. A system comprising:
a processing system including a processor; and
a storage device adapted to store a plurality of executable instructions that, when executed by the processing system, facilitate a performance of operations, the operations comprising:
obtaining sensor data comprising an image of a projection environment;
determining a plurality of physical objects portrayed within the image;
evaluating a plurality of physical properties of the plurality of physical objects according to the sensor data to obtain an evaluation, wherein the plurality of physical properties includes a mobility state of at least one of the plurality of physical objects;
selecting a first target object of the plurality of physical objects according to the evaluation, a first projection surface comprising a surface of the first target object;
modifying a source image according to the first projection surface to obtain a first modified source image; and
providing the first modified source image to a projector adapted to project the first modified source image onto the first projection surface.

18. The system of claim 17, wherein the operations further comprise:
identifying a projection objective for projecting the source image onto the first projection surface, wherein the selecting the first target object of the plurality of physical objects is further according to the projection objective.

19. The system of claim 17, wherein the operations further comprise:
selecting a second target object of the plurality of physical objects according to the evaluation, a second projection surface comprising a surface of the second target object; and modifying the source image according to the second projection surface to obtain a second modified source image.

20. A non-transitory, machine-readable medium, comprising executable instructions that, when executed by a processing system including a processor, facilitate performance of operations, the operations comprising:
  obtaining sensor data comprising an image of a projection environment;
  determining a plurality of physical objects portrayed within the image;
  characterizing a plurality of physical properties of the plurality of physical objects according to the sensor data to obtain a characterization;
  identifying a first target object of the plurality of physical objects according to the characterization, a first projection surface comprising a surface of the first target object, wherein the characterization includes a mobility state of the first target object;
  modifying source content according to the first projection surface to obtain first modified source content; and
  providing the first modified source content to a projector adapted to project the first modified source content onto the first projection surface.

* * * * *